US011462335B2

(12) United States Patent
Nishida et al.

(10) Patent No.: US 11,462,335 B2
(45) Date of Patent: Oct. 4, 2022

(54) SUPPORTING FORCE INSPECTION DEVICE AND SUPPORTING FORCE INSPECTION METHOD

(71) Applicant: MITSUBISHI HEAVY INDUSTRIES, LTD., Tokyo (JP)

(72) Inventors: Shingo Nishida, Tokyo (JP); Kazuo Hirota, Tokyo (JP); Ryoichi Kawakami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 492 days.

(21) Appl. No.: 16/617,134

(22) PCT Filed: Jan. 30, 2018

(86) PCT No.: PCT/JP2018/002820
§ 371 (c)(1),
(2) Date: Nov. 26, 2019

(87) PCT Pub. No.: WO2018/225292
PCT Pub. Date: Dec. 13, 2018

(65) Prior Publication Data
US 2021/0151209 A1    May 20, 2021

(30) Foreign Application Priority Data
Jun. 7, 2017    (JP) .............................. JP2017-113021

(51) Int. Cl.
*G21C 17/017* (2006.01)
*F22B 37/24* (2006.01)
(Continued)

(52) U.S. Cl.
CPC ............ *G21C 17/017* (2013.01); *F22B 37/24* (2013.01); *F28D 7/06* (2013.01); *F28F 9/0131* (2013.01);
(Continued)

(58) Field of Classification Search
CPC ......... G21C 17/017; F22B 37/24; F28D 7/06; F28F 9/0131; F28F 27/00; G01N 29/11; G01N 29/045
See application file for complete search history.

(56) References Cited

U.S. PATENT DOCUMENTS 4,523,470 A    6/1985 Muller et al.
5,028,381 A    7/1991 Dugue
(Continued)

FOREIGN PATENT DOCUMENTS

JP    58-132661 A    8/1983
JP    61-159077 U    10/1986
(Continued)

OTHER PUBLICATIONS

Notification Concerning Transmittal of International Preliminary Report on Patentability (Forms PCT/IB/326) issued in counterpart International Application No. PCT/JP2018/002820 dated Dec. 19, 2019 with Forms PCT/IB/373, PCT/IB/338 and PCT/ISA/237, with English translation (14 pages).
(Continued)

*Primary Examiner* — Devon Russell
(74) *Attorney, Agent, or Firm* — WHDA, LLP

(57) ABSTRACT

A supporting force inspection device for inspecting a supporting force of a vibration suppression member interposed between bend portions of a plurality of heat transfer tubes of a steam generator includes: an acceleration sensor for detecting a vibration state of the bend portion; a sensor holding part disposed inside the heat transfer tube and configured to hold the acceleration sensor; and a vibration force generation part configured to generate a vibration force for vibrating the heat transfer tube along a plane in which a curvature circle of the bend portion exists. The vibration force generation part is configured to cooperate with the sensor
(Continued)

holding part and vibrate the heat transfer tube along the plane in which the curvature circle exists.

14 Claims, 15 Drawing Sheets

(51) Int. Cl.
    *F28D 7/06*     (2006.01)
    *F28F 9/013*     (2006.01)
    *F28F 27/00*     (2006.01)
    *G01N 29/04*     (2006.01)
    *G01N 29/11*     (2006.01)
    *F28D 21/00*     (2006.01)
    *G01M 7/02*     (2006.01)

(52) U.S. Cl.
    CPC ............ *F28F 27/00* (2013.01); *G01N 29/045* (2013.01); *G01N 29/11* (2013.01); *F28D 2021/0054* (2013.01); *F28F 2200/00* (2013.01); *F28F 2265/26* (2013.01); *G01M 7/02* (2013.01); *G01N 2291/2636* (2013.01)

(56) References Cited

U.S. PATENT DOCUMENTS 5,100,610 A     3/1992   Pirl et al.
2019/0195707 A1*   6/2019   Iwamoto .................. G01L 1/00

FOREIGN PATENT DOCUMENTS

| JP | 2-80949 A | 3/1990 | |
|---|---|---|---|
| JP | 2012-63182 A | 3/2012 | |
| JP | 2014-41102 A | 3/2014 | |
| JP | 59-68160 B2 | 8/2016 | |
| WO | WO-2014030718 A1 * | 2/2014 | ............ G01N 29/07 |

OTHER PUBLICATIONS

International Search Report dated Apr. 3, 2018, issued in counterpart Application No. PCT/JP2018/002820 (9 pages).

* cited by examiner

A-A

SUPPORTING FORCE INSPECTION DEVICE AND SUPPORTING FORCE INSPECTION METHOD

TECHNICAL FIELD

The present disclosure relates to a supporting force inspection device and a supporting force inspection method.

BACKGROUND ART

A nuclear power plant includes a reactor, a steam generator, a steam turbine, a generator, etc. For instance, a pressurized water reactor (PWR) uses light water as a reactor cooler and a neutron moderator, and generates high-temperature and high-pressure water that boils in part of the reactor core. The steam generator exchanges heat between the high-temperature and high-pressure water (primary cooling water) and secondary cooling water to generate steam. The steam turbine drives a turbine with the steam, and the generator generates electric power with the driving force of the turbine.

The steam generator has a body portion that has a closed hollow shape. Inside the body portion, a tube bundle shroud is disposed at a predetermined distance from the inner wall surface of the body portion, and a plurality of heat transfer tubes having an opposite U shape are disposed inside the tube bundle shroud.

The plurality of heat transfer tubes of the steam generator are supplied with high-pressure water that serves as the primary cooling water, and heat the external secondary cooling water to generate steam, where the heat transfer tubes are likely to vibrate. Thus, to suppress vibration of the heat transfer tubes, anti-vibration members are interposed between the plurality of heat transfer tubes at U bend portions so as to be in contact with the heat transfer tubes.

The anti-vibration members are not fixed to the heat transfer tubes in order to allow the heat transfer tubes to be movable in a direction along a plane in which the curvature circle of the U bend exists (in-plane direction) in response to thermal expansion. Thus, clearance may be formed between the heat transfer tubes and the anti-vibration members due to production errors, assembly errors, wear and thermal expansion of various members, and the anti-vibration members may fail to support the heat transfer tubes sufficiently.

To solve the above problem, a supporting force measurement device is known, which measures the contact force between the heat transfer tubes and the vibration suppression members (see Patent Document 1).

The supporting force inspection device sends ultrasonic waves toward the inner surface of a heat transfer tube and receives ultrasonic waves that propagate inside the heat transfer tube, thereby obtaining a change in the propagation speed of the ultrasonic waves on the basis of signals from the sending part and the receiving part. The supporting force inspection device obtains stress of the heat transfer tube from the change in the propagation speed of the ultrasonic waves, and measures the supporting force of the vibration suppression member supporting the heat transfer tube.

CITATION LIST

Patent Literature

Patent Literature
Patent Document: JP2014-041102A

SUMMARY

Problems to be Solved

In the steam generator, the heat transfer tubes may vibrate in the in-plane direction at the U bend portions. In this regard, the supporting force measurement device described in the above Patent Document obtains the supporting force of a vibration suppression member supporting a heat transfer tube from the stress of the heat transfer tube, and thus measures the supporting force mainly in a direction orthogonal to the in-plane direction.

Thus, it is necessary to measure the supporting force of the vibration suppression member in the in-plane direction.

In view of the above, an object of at least one embodiment of the present invention is to accurately inspect the supporting force of a vibration suppression member interposed between bend portions of a plurality of heat transfer tubes of a steam generator, in a direction along a plane in which the curvature circles of the bend portions exist.

Solution to the Problems (1) According to at least one embodiment of the present invention, a supporting force inspection device for inspecting a supporting force of a vibration suppression member interposed between bend portions of a plurality of heat transfer tubes of a steam generator includes: an acceleration sensor for detecting a vibration state of the bend portion; a sensor holding part disposed inside the heat transfer tube and configured to hold the acceleration sensor; and a vibration force generation part configured to generate a vibration force for vibrating the heat transfer tube along a plane in which a curvature circle of the bend portion exists. The vibration force generation part is configured to cooperate with the sensor holding part and vibrate the heat transfer tube along the plane in which the curvature circle exists.

With the above configuration (1), the supporting force inspection device includes a vibration force generation part configured to generate a vibration force for vibrating the heat transfer tube along a plane in which the curvature circle of the bend portion exists, and the vibration force generation part is configured to cooperate with the sensor holding part and vibrate the heat transfer tube along the plane in which the curvature circle exists. Thus, it is possible to vibrate the heat transfer tube along the plane in which the curvature circle of the bend portion exists. Furthermore, since it is possible to detect the vibration state of the bend portion with the acceleration sensor, it is possible to accurately inspect the supporting force of the vibration suppression member in the direction along the plane in which the curvature circle of the bend portion exists, from the vibration state of the bend portion detected by the acceleration sensor.

(2) In some embodiments, in the above configuration (1), the acceleration sensor is configured to detect the vibration state of the bend portion in a state where the sensor holding part is engaged with an inner surface of the heat transfer tube.

With the above configuration (2), it is possible to detect the vibration state of the bend portion with the acceleration sensor while the sensor holding part is engaged with the inner surface of the heat transfer tube, and thus, for instance, by causing the sensor holding part to be engaged with the inner surface of the heat transfer tube at the position of interposition of the vibration suppression member and detecting the vibration state of the bend portion, it is possible to accurately inspect the supporting force of the vibration suppression member.

(3) In some embodiments, in the above configuration (2), the sensor holding part includes a motor holding body holding a motor, an eccentric cam configured to be rotated relative to the motor holding body by the motor, and a sensor holding body holding the acceleration sensor and fixed to the motor holding body, the sensor holding part being configured to be engaged with the inner surface of the heat transfer tube as the motor rotates the eccentric cam relative to the motor holding body and the motor holding body and the eccentric cam press the inner surface of the heat transfer tube.

With the above configuration (3), by rotating the eccentric cam relative to the motor holding body with the motor and pressing the inner surface of the heat transfer tube with the motor holding body and the eccentric cam, the sensor holding part is engaged with the inner surface of the heat transfer tube. Thus, it is possible to cause the sensor holding part to be engaged with the inner surface of the heat transfer tube with a simple configuration. Further, since it is possible to cause the sensor holding part to be engaged with the inner surface of the heat transfer tube with a simple configuration, it is possible to reduce the size of the sensor holding part, and it is possible to place the sensor holding part inside the heat transfer tube even when the heat transfer tube has a small radius or a small curvature radius.

(4) In some embodiments, in the above configuration (2) or (3), the vibration force generation part is configured to generate the vibration force so that the vibration force changes with time.

With the above configuration (4), the vibration force generation part is capable of generating a vibration force so that the vibration force changes with time. Thus, it is possible to vibrate the heat transfer tube efficiently along the plane in which the curvature circle exists, and to improve the accuracy in inspecting the supporting force in a direction along the plane in which the curvature circle of the bend portion exists.

(5) In some embodiments, in the above configuration (4), the sensor holding part is configured to close an inside of the heat transfer tube in a state of being engaged with the inner surface of the heat transfer tube, and the vibration force generation part is configured to apply a pressure to a liquid filling the inside of the heat transfer tube closed by the sensor holding part so that the pressure changes with time.

With the above configuration (5), the sensor holding part is configured to close the inside of the heat transfer tube in a state of being engaged with the inner surface of the heat transfer tube, and the vibration force generation part is configured to apply a pressure to a liquid filling the inside of the heat transfer tube closed by the sensor holding part so that the pressure changes with time. That is, the vibration force generation part is configured to cooperate with the sensor holding part and vibrate the heat transfer tube along the plane in which the curvature circle of the bend portion of the heat transfer tube exists.

Thus, it is possible to vibrate the heat transfer tube efficiently along the plane in which the curvature circle of the bend portion exists by using the hydrostatic pressure of the liquid, and it is possible to improve the accuracy in inspecting the supporting force in a direction along the plane in which the curvature circle of the bend portion exists.

Further, by changing the time interval of changing the pressure applied to the liquid, it is possible to change the frequency of the vibration force easily. Accordingly, it is possible to expand the frequency range of the vibration force, and thus it is possible to vibrate the heat transfer tube with a vibration force of various frequencies, which makes it possible to improve the inspection accuracy of the supporting force.

Furthermore, by extending the time interval to change the pressure applied to the liquid, it is possible to extend the time interval of generation of the vibration force without lowering the pressure applied to the liquid. Accordingly, even in a region where the frequency of the vibration force is low, it is possible to obtain a sufficient vibration force for vibrating the heat transfer tube, which improves the accuracy in inspecting the supporting force in the low frequency range.

Furthermore, with the above configuration (5), the sensor holding part is configured so as to close the inside of the heat transfer tube while being engaged with the inner peripheral surface of the heat transfer tube, and thus it is not necessary to prepare another member for closing the inside of the heat transfer tube and fix the member inside the heat transfer tube. Accordingly, it is possible to simplify the configuration of the supporting force inspection device.

(6) In some embodiments, in the above configuration (2) or (3), the vibration force generation part is configured to emit a projectile into the heat transfer tube in a tube axial direction toward the sensor holding part engaged with the inner surface of the heat transfer tube, and the sensor holding part is configured to vibrate the heat transfer tube along the plane in which the curvature circle exists by transmitting, to the heat transfer tube, an impulse force generated from collision with the projectile.

With the above configuration (6), the vibration force generation part is configured to emit a projectile into the heat transfer tube in a tube axial direction toward the sensor holding part engaged with the inner surface of the heat transfer tube, and the sensor holding part is configured to vibrate the heat transfer tube along the plane in which the curvature circle exists by transmitting, to the heat transfer tube, an impulse force generated from collision with the projectile. That is, the vibration force generation part is configured to cooperate with the sensor holding part and vibrate the heat transfer tube along the plane in which the curvature circle of the bend portion of the heat transfer tube exists.

Thus, at the engagement position of the sensor holding part, it is possible to transmit the vibration force along the plane in which the curvature circle of the bend portion exists efficiently to the heat transfer tube. Accordingly, for instance, by causing the sensor holding part to be engaged with the inner surface of the heat transfer tube at the position of interposition of the vibration suppression member, it is possible to transmit the vibration force to the heat transfer tube efficiently at the position of interposition of the vibration suppression member, and detect the vibration state of the bend portion at the position of interposition of the vibration suppression member, which makes it possible to accurately inspect the supporting force of the vibration suppression member.

With the above configuration (6), the sensor holding part is configured so as to vibrate the heat transfer tube along the plane in which the curvature circle of the bend portion exists by transmitting the impulse force generated from collision with the projectile to the heat transfer tube, and thus the sensor holding part also functions as a member to transmit vibration to the heat transfer tube, which makes it possible to simplify the configuration of the supporting force inspection device.

(7) In some embodiments, in the above configuration (2) or (3), the vibration force generation part is held by the sensor holding part and is configured to apply the vibration force to the sensor holding part, and the sensor holding part is configured to vibrate the heat transfer tube along the plane in which the curvature circle exists by transmitting, to the heat transfer tube, the vibration force applied by the vibration force generation part held by the sensor holding part.

With the above configuration (7), the sensor holding part holds the vibration force generation part, and the sensor holding part is configured to vibrate the heat transfer tube along the plane in which the curvature circle of the bend portion exists by transmitting a vibration force applied by the vibration force generation part to the heat transfer tube. That is, the vibration force generation part is configured to cooperate with the sensor holding part and vibrate the heat transfer tube along the plane in which the curvature circle of the bend portion of the heat transfer tube exists.

Thus, at the engagement position of the sensor holding part, it is possible to transmit the vibration force along the plane in which the curvature circle of the bend portion exists to the heat transfer tube efficiently. Accordingly, for instance, by causing the sensor holding part to be engaged with the inner surface of the heat transfer tube at the position of interposition of the vibration suppression member, it is possible to transmit the vibration force to the heat transfer tube efficiently at the position of interposition of the vibration suppression member, and detect the vibration state of the bend portion at the position of interposition of the vibration suppression member, which makes it possible to accurately inspect the supporting force of the vibration suppression member.

Furthermore, with the above configuration (7), the sensor holding part is configured to vibrate the heat transfer tube along the plane in which the curvature circle of the bend portion exists by transmitting the vibration force applied by the vibration force generation part to the heat transfer tube, and thus the sensor holding part also functions as a member to transmit vibration to the heat transfer tube, which makes it possible to simplify the configuration of the supporting force inspection device.

(8) In some embodiments, in the above configuration (7), the vibration force generation part is configured to apply the vibration force to the sensor holding part by emitting a projectile.

With the above configuration (8), the vibration force generation part is configured to apply a vibration force to the sensor holding part by emitting the projectile, and thus it is possible to generate a vibration force efficiently with a simple configuration, and reduce the size of the vibration force generation part.

(9) In some embodiments, in the above configuration (7), the vibration force generation part is configured to apply the vibration force to the sensor holding part so that a magnitude of the vibration force changes with time by injecting a fluid intermittently.

With the above configuration (9), the vibration force generation part is configured to apply a vibration force to the sensor holding part so that the magnitude of the vibration force changes with time by injecting a fluid, and thus it is possible to generate a vibration force efficiently with a simple configuration, and reduce the size of the vibration force generation part.

Furthermore, by changing the time interval of changing the injection amount of the fluid, it is possible to change the frequency of the vibration force easily. Accordingly, it is possible to expand the frequency range of the vibration force, and thus it is possible to vibrate the heat transfer tube with a vibration force of various frequencies, which makes it possible to improve the inspection accuracy of the supporting force.

Furthermore, by extending the time interval to change the injection amount of the fluid, it is possible to extend the time interval of generation of the reaction force without reducing the magnitude of the reaction force generated from injection of the fluid. Accordingly, even in a region where the frequency of the vibration force is low, it is possible to obtain a sufficient vibration force for vibrating the heat transfer tube, and improve the inspection accuracy of the supporting force in the low frequency range.

(10) In some embodiments, in the above configuration (1), the acceleration sensor is configured to detect the vibration state of the bend portion in a state where the sensor holding part is moving inside the heat transfer tube, the vibration force generation part is configured to emit the sensor holding part into the heat transfer tube in a tube axial direction, and the sensor holding part is configured to vibrate the heat transfer tube along the plane in which the curvature circle exists by moving inside the heat transfer tube while sliding on the bend portion.

With the above configuration (10), the acceleration sensor is configured to detect the vibration state of the bend portion in a state where the sensor holding part is moving inside the heat transfer tube, the vibration force generation part is configured to emit the sensor holding part into the heat transfer tube in the tube axial direction, and the sensor holding part is configured to vibrate the heat transfer tube along the plane in which the curvature circle exists by moving inside the heat transfer tube while sliding on the bend portion. That is, the vibration force generation part is configured to cooperate with the sensor holding part and vibrate the heat transfer tube along the plane in which the curvature circle of the bend portion of the heat transfer tube exists.

Accordingly, it is possible to detect the vibration state of the bend portion with the acceleration sensor while the sensor holding part is moving through the heat transfer tube, and thus it is possible to inspect the supporting force of the vibration suppression member quickly. Furthermore, it is possible to inspect the supporting force of each of the vibration suppression members disposed at different positions of the bend portion with a single emission of the sensor holding part, and thus it is efficient.

Further, since the sensor holding part is configured to move inside the heat transfer tube while sliding on the bend portion, it is possible to generate a vibration force in the plane in which the curvature circle of the bend portion exists with a simple configuration.

Furthermore, with the above configuration (10), since the sensor holding part is configured so as to vibrate the heat transfer tube along the plane in which the curvature circle of the bend portion exists by moving inside the heat transfer tube while sliding on the bend portion, the sensor holding part also functions as a member to transmit vibration to the heat transfer tube, which makes it possible to simplify the configuration of the supporting force inspection device.

(11) According to at least one embodiment of the present invention, a supporting force inspection device for inspecting a supporting force of a vibration suppression member interposed between bend portions of a plurality of heat transfer tubes of a steam generator includes: an acceleration sensor for detecting a vibration state of the bend portion; a sensor holding part disposed outside the heat transfer tube and configured to hold the acceleration sensor; a vibration force generation part configured to generate a vibration force for vibrating the heat transfer tube along a plane in which a curvature circle of the bend portion exists; and a vibration rod connecting the sensor holding part and the vibration force generation part. The vibration force generation part is configured to vibrate the heat transfer tube along the plane in which the curvature circle exists via the vibration rod.

With the above configuration (11), the supporting force inspection device includes the vibration rod that connects the sensor holding part disposed outside the heat transfer tube and the vibration force generation part, and the vibration force generation part is configured to vibrate the heat transfer tube along the plane in which the curvature circle of the bend portion exists via the vibration rod.

Accordingly, when the bend portion is accessible from the outer peripheral surface side of the heat transfer tube, it is possible to vibrate the heat transfer tube along the plane in which the curvature circle of the bend portion exists easily, and thus it is possible to inspect the supporting force of the vibration suppression member in a direction along the plane in which the curvature circle of the bend portion exists accurately.

(12) In some embodiments, in the above configuration (11), the vibration rod is configured to be insertable between a first heat transfer tube and a second heat transfer tube disposed at a distance from one another in a direction which intersects with the plane in which the curvature circle exists, the sensor holding part and a pair of gripping portions are disposed on a first end side of the vibration rod, the pair of gripping portions protruding in a direction which intersects with an extension direction of the vibration rod and being capable of gripping an outer peripheral surface of the heat transfer tube, the vibration force generation part is connected to a second end side of the vibration rod, and the vibration rod is configured such that the pair of gripping portions are insertable between the first heat transfer tube and the second heat transfer tube when a protruding direction of the pair of gripping portions is aligned with at least a direction along the plane in which the curvature circle exists, and that the pair of gripping portions are capable of gripping the outer peripheral surface of the first or second heat transfer tube when the protruding direction of the pair of gripping portions inserted between the first heat transfer tube and the second heat transfer tube is aligned with the direction which intersects with the plane in which the curvature circle exists.

With the above configuration (12), the vibration rod is configured to be insertable between the first heat transfer tube and the second heat transfer tube disposed at a distance from one another in a direction which intersects with the plane in which the curvature circle of the bend portion exists, the sensor holding part and a pair of gripping portions are disposed on the first end side of the vibration rod, and the vibration force generation part is connected to the second end side of the vibration rod. Accordingly, it is possible to simplify the configuration of the supporting force inspection device.

Furthermore, for instance, even for a heat transfer tube bundle in which a plurality of heat transfer tubes are disposed adjacently at small distances as in the steam generator, it is possible to insert the pair of gripping portions to the vicinity of a heat transfer tube from outside the heat transfer tube bundle, and grip the outer peripheral surface of the heat transfer tube with the pair of gripping portions. Thus, even for a heat transfer tube bundle in which a plurality of heat transfer tubes are disposed adjacently at small distances as in the steam generator, it is possible to inspect the supporting force of the vibration suppression member in a direction along the plane in which the curvature circle of the bend portion exists for a selected heat transfer tube. Thus, it is possible to provide a supporting force inspection device suitable to inspect the supporting force of the vibration suppression member to support a heat transfer tube in a device including a plurality of heat transfer tubes disposed adjacently at small distances.

(13) According to at least one embodiment of the present invention, a method of inspecting a supporting force of a vibration suppression member interposed between bend portions of a plurality of heat transfer tubes of a steam generator includes: a placement step of placing, inside the heat transfer tube, a sensor holding part to hold an acceleration sensor for detecting a vibration state of the bend portion; a vibration step of vibrating the heat transfer tube along a plane in which a curvature circle of the bend portion exists, through cooperation of the sensor holding part and a vibration force generation part configured to generate a vibration force for vibrating the heat transfer tube along the plane in which the curvature circle exists; and an acceleration detection step of detecting the vibration state of the bend portion vibrated in the vibration step by using the acceleration sensor held by the sensor holding part.

According to the above method (13), the vibration force generation part configured to generate a vibration force for vibrating the heat transfer tube along the plane in which the curvature circle of the bend portion exists cooperates with the sensor holding part holding the acceleration sensor, whereby it is possible to vibrate the heat transfer tube along the plane in which the curvature circle exists. Furthermore, since it is possible to detect the vibration state of the bend portion with the acceleration sensor, it is possible to inspect the supporting force of the vibration suppression member in a direction along the plane in which the curvature circle of the bend portion exists accurately from the vibration state of the bend portion detected by the acceleration sensor.

(14) In some embodiments, in the above method (13), the placement step includes closing an inside of the heat transfer tube with the sensor holding part being engaged with an inner surface of the heat transfer tube, and the vibration step includes vibrating the heat transfer tube along the plane in which the curvature circle exists by filling the inside of the heat transfer tube closed by the sensor holding part with a liquid and applying a pressure to the liquid filling the inside of the heat transfer tube so that the pressure changes with time.

The above method (14) includes closing, with the sensor holding part, an inside of the heat transfer tube in a state of being engaged with the inner surface of the heat transfer tube, filling a liquid inside the heat transfer tube closed by the sensor holding part, and applying a pressure to a liquid filling the inside of the heat transfer tube so that the pressure changes with time. Thus, it is possible to vibrate the heat transfer tube efficiently along the plane in which the curvature circle of the bend portion exists by using the hydrostatic pressure of the liquid, and it is possible to improve the accuracy in inspecting the supporting force in a direction along the plane in which the curvature circle of the bend portion exists.

Further, by changing the time interval of changing the pressure applied to the liquid, it is possible to change the frequency of the vibration force easily. Accordingly, it is possible to expand the frequency range of the vibration force, and thus it is possible to vibrate the heat transfer tube with a vibration force of various frequencies, which makes it possible to improve the accuracy in inspecting the supporting force.

Furthermore, by extending the time interval to change the pressure applied to the liquid, it is possible to extend the time interval of generation of the reaction force without lowering the pressure applied to the liquid. Accordingly, even in a region where the frequency of the vibration force is low, it is possible to obtain a sufficient vibration force for vibrating the heat transfer tube, and thus it is possible to improve the accuracy in inspecting the supporting force in the low frequency range.

Advantageous Effects

According to at least one embodiment of the present invention, it is possible to accurately inspect the supporting force of a vibration suppression member interposed between bend portions of a plurality of heat transfer tubes of a steam generator, in a direction along a plane in which the curvature circle of a bend portion exists.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
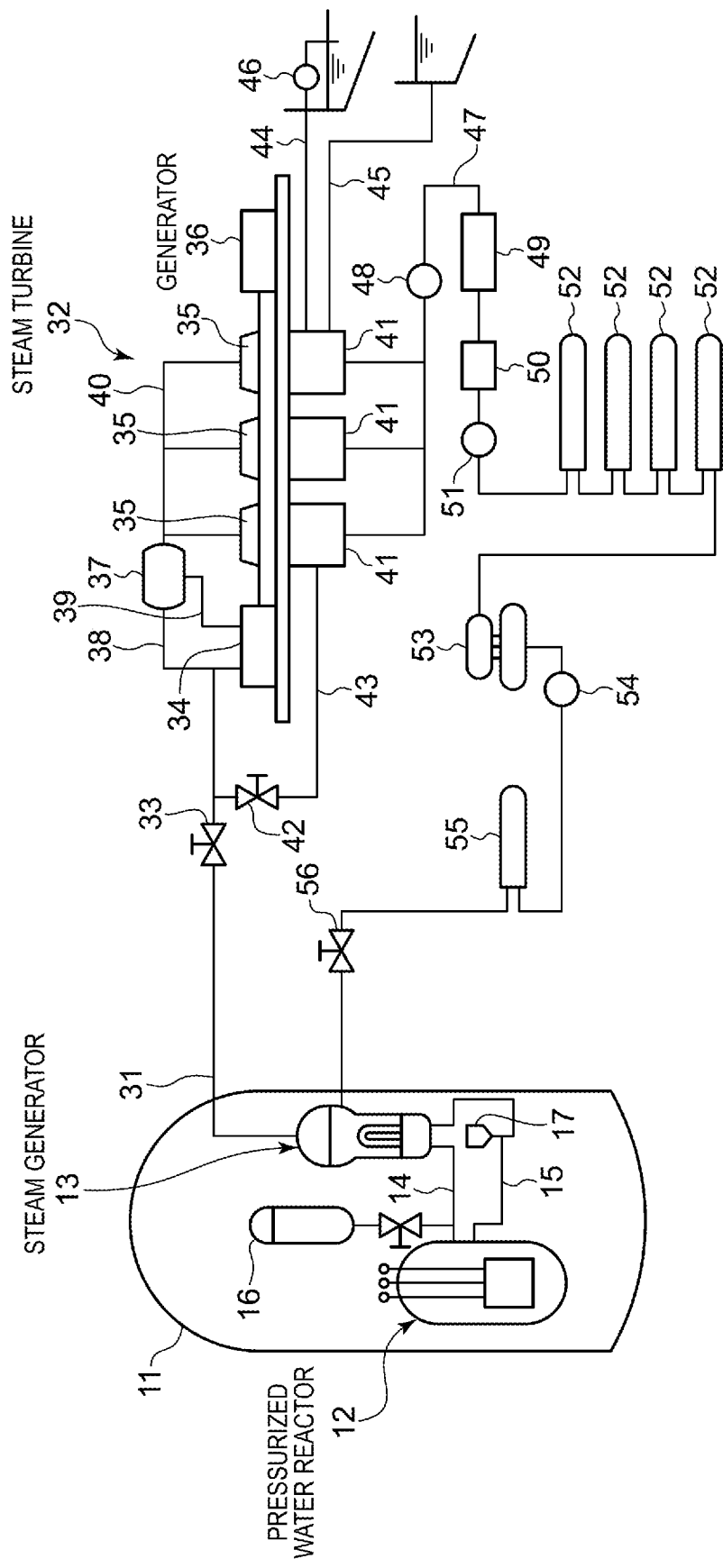
FIG. 1 is a schematic configuration diagram of a nuclear power plant to which a steam generator to be inspected by a supporting force inspection device according to some embodiments is applied.
Figure 2:
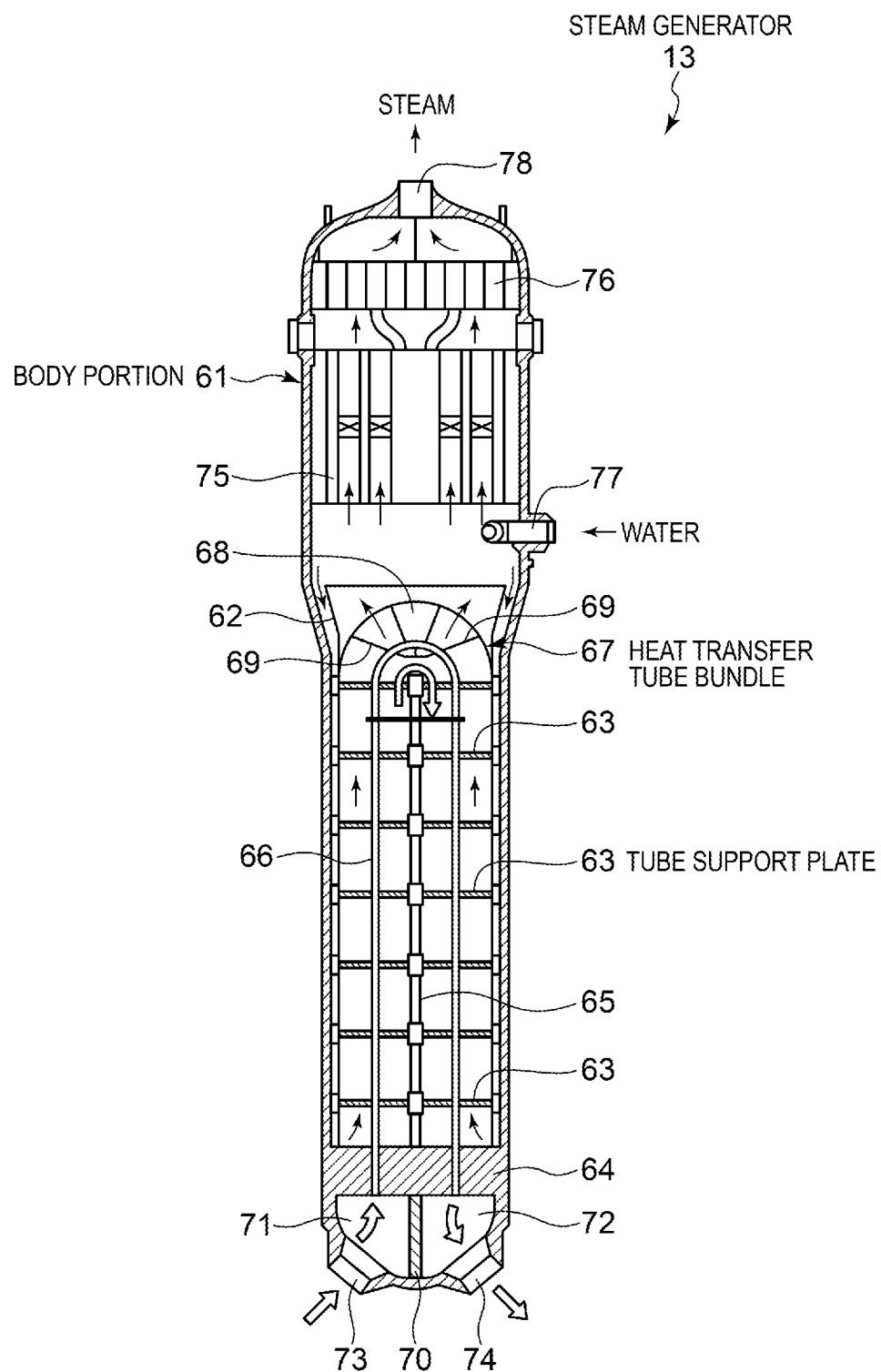
FIG. 2 is a schematic configuration diagram of a steam generator to be inspected by a supporting force inspection device according to some embodiments.
Figure 3:
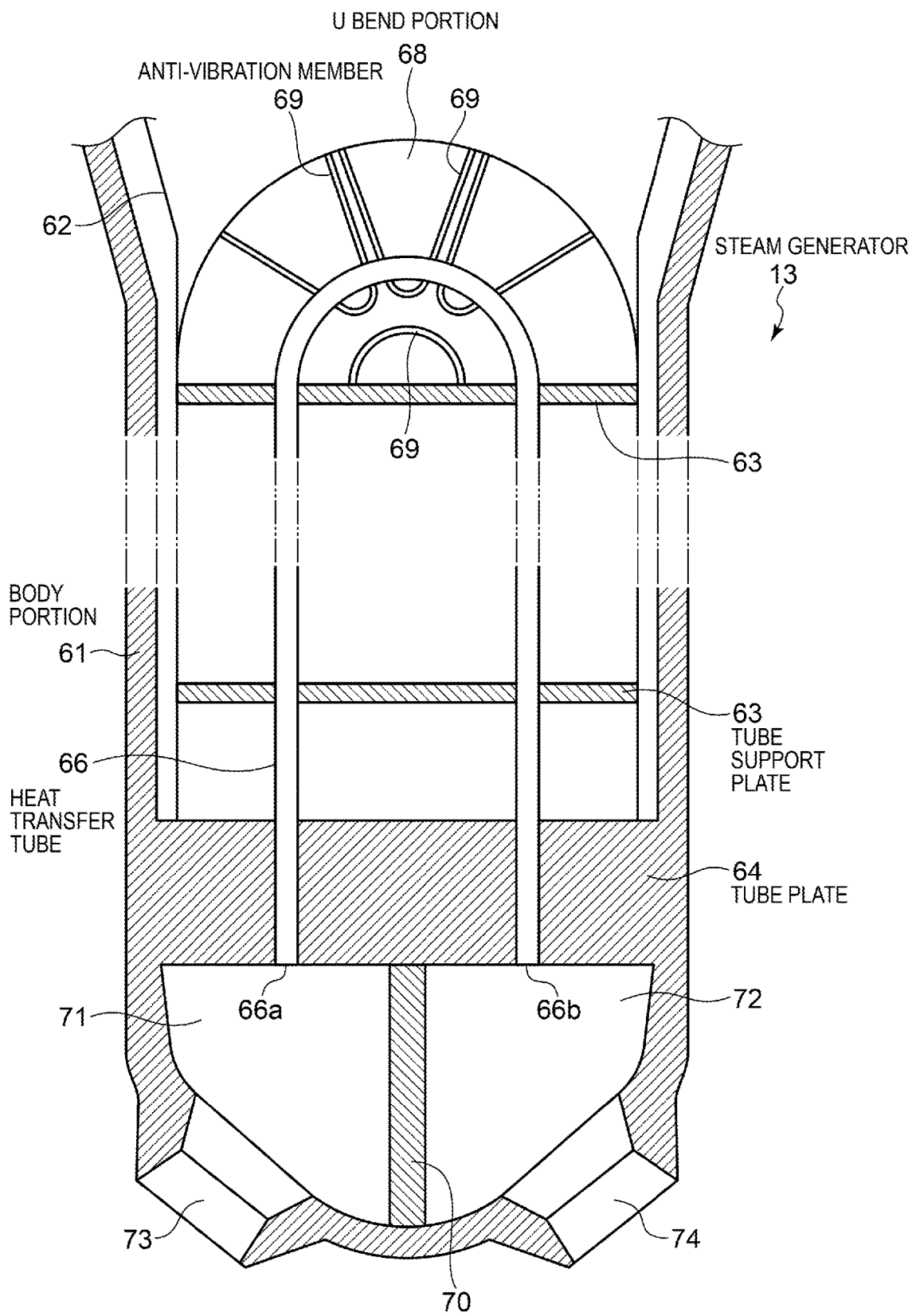
FIG. 3 is a cross-sectional diagram schematically showing the vicinity of a heat transfer tube of the steam generator depicted in FIG. 2.

With reference to FIG. 1, a nuclear power plant will be described, to which a steam generator to be inspected by a supporting force inspection device according to some embodiments is applied. FIG. 1 is a schematic configuration diagram of a nuclear power plant to which a steam generator to be inspected by a supporting force inspection device according to some embodiments is applied. FIG. 2 is a schematic configuration diagram of a steam generator to be inspected by a supporting force inspection device according to some embodiments. FIG. 3 is a cross-sectional diagram schematically showing the vicinity of a heat transfer tube of the steam generator depicted in FIG. 2.

The reactor of the nuclear power plant depicted in FIG. 1 is a pressurized water reactor (PWR) that uses light water as a reactor cooler and a neutron moderator, and generates high-temperature and high-pressure water that does not boil over the reactor core. The high-temperature and high-pressure water is sent to a steam generator and steam is generated through heat exchange. The steam is sent to a turbine generator and electric power is generated.

In the nuclear power plant depicted in FIG. 1, a reactor container 11 houses a pressurized water reactor 12 and a steam generator 13. The pressurized water reactor 12 and the steam generator 13 are coupled to one another via a high-pressure side feed pipe 14 and a low-pressure side feed pipe 15. A pressurizer 16 is disposed in the high-pressure side feed pipe 14, and a primary cooling water pump 17 is disposed in the low-pressure side feed pipe 15. In this case, light water is used as the reducer and the primary cooling water (cooling medium). To suppress boiling of the primary cooling water in the reactor core part, the primary cooling system performs a control to maintain the high-pressure state of approximately 150 to 160 atm by using the pressurizer 16.

Thus, in the pressurized water reactor 12, light water as the primary cooling water is heated by low-enriched uranium or MOX that serves as a fuel (reactor fuel), and the primary cooling water having a high temperature is sent to the steam generator 13 through the high-pressure side feed pipe 14 while being maintained at a predetermined high pressure by the pressurizer 16. In the steam generator 13, heat is exchanged between the high-temperature and high-pressure primary cooling water and the secondary cooling water, and the cooled primary cooling water is returned to the pressurized water reactor 12 through the low-pressure side feed pipe 15.

The steam generator 13 is coupled to the steam turbine 32 via the pipe 31 that feeds the heated secondary cooling water, that is, steam. A main steam separation valve 33 is disposed in the pipe 31. The steam turbine 32 includes a high-pressure turbine 34 and a low-pressure turbine 35, and a generator (generating device) 36 is connected to the steam turbine 32. Furthermore, a moisture separation heater 37 is disposed between the high-pressure turbine 34 and the low-pressure turbine 35. A cooling water branch pipe 38 branched from the pipe 31 is coupled to the moisture separation heater 37, while the high-pressure turbine 34 and the moisture separation heater 37 are coupled to one another via a low-temperature re-heating pipe 39, and the moisture separation heater 37 and the low-pressure turbine 35 are coupled to one another via a high-pressure re-heating pipe 40.

Furthermore, the low-pressure turbine 35 of the steam turbine 32 has a condenser 41. A turbine bypass pipe 43 having a bypass valve 42 from the pipe 31 is connected to the condenser 41, and a water intake pipe 44 and a water discharge pipe 45 for intaking and discharging cooling water (e.g. sea water) are coupled to the condenser 41. The water intake pipe 44 has a circulation water pump 46, and far end portions of the water intake pipe 44 and the water discharge pipe 45 are disposed under the sea.

Further, a pipe 47 is connected to the condenser 41, and a condenser pump 48, a grand condenser 49, a condensate demineralizing device 50, a condensate booster pump 51, and a low-pressure water supply heater 52 are connected to the pipe 47. Further, a deaerator 53 is coupled to the pipe 47, and a main water supply pump 54, a high-pressure water supply heater 55, and a main water supply control valve 56 are disposed in the pipe 47.

Thus, in the steam generator 13, the steam generated from heat exchange with the high-temperature and high-pressure primary cooling water is sent to the steam turbine 32 through the pipe 31 (from the high-pressure turbine 34 to the low-pressure turbine 35). The steam drives the steam turbine 32 and the generator 36 generates electric power. At this time, the steam from the steam generator 13 drives the high-pressure turbine 34, and then, after the moisture is removed from the steam by the moisture separation heater 37 and the steam is heated, the steam drives the low-pressure turbine 35. Further, the steam after driving the steam turbine 32 is cooled by the condenser 41 using sea water and becomes condensate water, and is returned to the steam generator 13 through the grand condenser 49, the condensate demineralizing device 50, the low-pressure water supply heater 52, the deaerator 53, and the high-pressure water supply heater 55.

In the steam generator 13 of the nuclear power plant having the above configuration, as depicted in FIG. 2, the body portion 61 has a closed hollow cylindrical shape, and the lower portion of the body portion 61 has a slightly smaller diameter than the upper portion of the body portion 61. In the lower portion of the body portion 61, a tube bundle shroud 62 having a cylindrical shape is disposed at a predetermined distance from the inner wall surface of the body portion 61. The tube bundle shroud 62 has a plurality of tube support plates 63 disposed inside thereof, corresponding to a predetermined height position, and a tube plate 64 is fixed below the tube support plates 63. The respective tube support plates 63 are supported by a plurality of stay rods 65 extending upward from the tube plate 64. Further, the tube bundle shroud 62 has a heat transfer tube bundle 67 disposed inside thereof, which includes a plurality of heat transfer tubes 66 having an opposite U shape.

In the heat transfer tube bundle 67, each heat transfer tube 66 is configured to have a U bend portion 68 having a U shape at the upper portion. The inlet-side lower end portion 66a and the outlet-side lower end portion 66b of the heat transfer tube 66 are each expanded to be supported by the tube plate 64, and the middle section (intermediate section) of the heat transfer tube 66 is supported by the plurality of tube support plates 63. At the U bend portions 68, a plurality of heat transfer tubes 66 are disposed substantially parallel in the in-out direction (top-bottom direction) of the tube bundle shroud 62, and substantially parallel in the radial direction (horizontal direction) of the tube bundle shroud 62. Further, a plurality of anti-vibration members (vibration suppression members) 69 are interposed between the respective heat transfer tubes disposed in the radial direction of the tube bundle shroud 62.

That is, a plurality of heat transfer tubes 66 are disposed in the front-back direction of the drawing of FIG. 3, and the anti-vibration members 69 are interposed between the U bend portions 68 of the heat transfer tubes 66 disposed next to one another in the front-back direction of the drawing of FIG. 3. The heat transfer tubes 66 are in contact with the anti-vibration members 69 at the outer peripheral surfaces of the U bend portions 68 at the front side and the back side in the front-back direction of the drawing of FIG. 3.

In the following description, the direction parallel to the drawing of FIG. 3, that is, the direction along the plane in which the curvature circle of the U bend portion 68 being a bend portion of the heat transfer tube 66 exists is also referred to as the in-plane direction. That is, the curvature circle of the U bend portion 68 is a circle, a part of whose arc is the center line of the heat transfer tube 66 at the U bend portion 68.

The anti-vibration members 69 are not fixed to the heat transfer tubes 66 so as to allow the heat transfer tubes 66 to be movable in the in-plane direction in response to thermal expansion.

Further, the lower portion of the body portion 61 has a spherical shape. An inlet chamber 71 and an outlet chamber 72 are formed by a partition wall 70 below the tube plate 64, and an inlet nozzle 73 and an outlet nozzle 74 are formed, such that an end portion of each heat transfer tube 66 is in communication with the inlet chamber 71, and the other end of each heat transfer tube 66 is in communication with the outlet chamber 72.

Furthermore, the body portion 61 includes a gas-water separator 75 that separates supply water into steam and hot water above the heat transfer tube bundle 67, and a moisture separator 76 that removes moisture from the separated steam so that the steam becomes almost dry steam. Further, at the body portion 61, a water supply pipe 77 that supplies the secondary cooling water to the inside is disposed between the heat transfer tube bundle 67 and the gas-water separator 75, and a steam outlet 78 is formed on a ceiling portion of the body portion 61. That is, the secondary cooling water supplied to the inside from the water supply pipe 77 flows downward along the tube bundle shroud 62, circulates upward at the tube plate 64, and exchanges heat with hot water (primary cooling water) flowing through each heat transfer tube 66 when flowing upward through the heat transfer tube bundle 67.

Thus, as depicted in FIGS. 1 and 2, the primary cooling water heated in the pressurized water reactor 12 is sent to the inlet chamber 71 of the steam generator 13 through the high-pressure side feed pipe 14, circulates through a number of heat transfer tubes 66 and reaches the outlet chamber 72. Furthermore, the secondary cooling water cooled by the condenser 41 is sent to the water supply pipe 77 of the steam generator 13 through a cooling water pipe 47, and exchanges heat with hot water (primary cooling water) flowing through the heat transfer tubes 66 through the body portion 61. That is, in the body portion 61, heat is exchanged between the high-temperature and high-pressure primary cooling water and the secondary cooling water, and the cooled primary cooling water is returned to the pressurized water reactor 12 through the cooling water pipe 15 from the outlet chamber 72.

Furthermore, the secondary cooling water having exchanged heat with the high-temperature and high-pressure primary cooling water flows upward through the body portion 61, and is separated into steam and hot water at the gas-water separator 75. The steam is deprived of the moisture at the moisture separator 76, and is sent to the steam turbine 32 through the pipe 31 from the steam outlet 78.

In the steam generator 13 having the above configuration, high-pressure water being the primary cooling water flows through the plurality of heat transfer tubes 66 as depicted in FIG. 3, and heats the secondary cooling water flowing through the body portion 61 to generates steam. Therefore, the heat transfer tubes 66 are likely to vibrate Thus, the heat transfer tube 66 is supported by the tube plate 64 at the inlet-side lower end portion 66a and the outlet-side lower end portion 66b, and the U bend portion 68 at the upper end portion is supported by the anti-vibration members 69 as described above. That is, the respective anti-vibration members 69 are interposed between the heat transfer tubes 66 so as to contact with the heat transfer tubes 66 at the U bend portions 68, and thereby vibration of the heat transfer tubes is suppressed.

The anti-vibration members 69 are in contact with the outer peripheral surfaces of the heat transfer tubes 66 from a direction that intersects with the in-plane direction, as described above.

Meanwhile, it is known that, in the steam generator 13, the heat transfer tubes 66 may vibrate also in the in-plane direction at the U bend portions 68. Thus, it is necessary to suppress vibration of the heat transfer tubes 66 in the in-plane direction with the anti-vibration members 69.

Thus, to confirm the effect of the anti-vibration member 69 to suppress vibration of the heat transfer tube 66 in the in-plane direction, it is required to accurately measure the supporting force of the anti-vibration member 69 to support the heat transfer tube 66 in the in-plane direction.

In this regard, by using the supporting force inspection device according to some embodiments described below, for instance, it is possible to measure the supporting force of the anti-vibration member 69 to support the heat transfer tube 66 in the in-plane direction, during the production stage of the steam generator 13, or during the regular maintenance after starting use of the steam generator 13, for instance.

FIGS. 4 to 8 are each a schematic diagram showing the configuration of supporting force inspection devices 100A to 100E according to respective embodiments.

The supporting force inspection devices 100A to 100E of embodiments depicted in FIGS. 4 to 8 respectively include sensor holding parts 110A to 110E each of which is disposed inside the heat transfer tube 66, and vibration force generation parts 120A to 120E each of which generates a vibration force for vibrating the heat transfer tube 66 along the plane in which the curvature circle of the U bend portion 68, that is, the bend portion of the heat transfer tube 66, exists. As described below, the vibration force generation parts 120A to 120E are configured to cooperate with the respective sensor holding parts 110A to 110E and vibrate the heat transfer tube 66 along the plane in which the curvature circle of the bend portion of the heat transfer tube 66 exists.

The sensor holding parts 110A to 110D depicted in FIGS. 4 to 7 are each configured to be capable of being engaged and disengaged with the inner surface of the heat transfer tube 66. Further, the sensor holding parts 110A to 110D all have the same configuration, and thus the schematic configuration of the sensor holding part 110A will be described with reference to FIG. 9, representing the sensor holding parts 110A to 110D.

Figure 9:
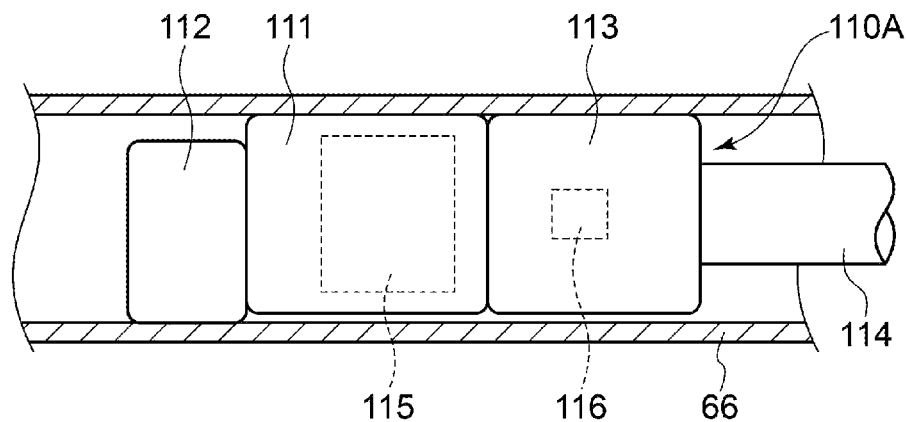
FIG. 9 is a schematic configuration diagram of a sensor holding part disposed inside a heat transfer tube, the sensor holding part being engaged with the inner surface of the heat transfer tube.

FIG. 9 is a schematic configuration diagram of a sensor holding part 110A disposed inside the heat transfer tube 66, the sensor holding part 110A being engaged with the inner surface of the heat transfer tube 66.

As depicted in FIG. 9, the sensor holding part 110A includes a motor holding body 111 that holds a motor 115, an eccentric cam 112 configured to be rotated by the motor 115 relative to the motor holding body 111, and a sensor holding body 113 fixed to the motor holding body 111 and holding an acceleration sensor 116 for detecting the vibration state of the bend portion of the heat transfer tube 66. A flexible cable 114 is attached to the sensor holding body 113, and the flexible cable 114 has a line for transmitting output from the acceleration sensor 116 and a line for supplying electric power to the motor 115 inserted therethrough.

Figure 10:
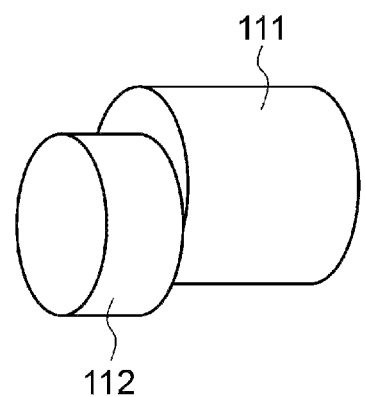
FIG. 10 is a perspective view of a motor holding body and an eccentric cam.

FIG. 10 is a perspective view of the motor holding body 111 and the eccentric cam 112. As depicted in FIG. 10, the motor 115 rotates the eccentric cam 112 relative to the motor holding body 111, and thereby it is possible to change the position of the eccentric cam 112 relative to the motor holding body 111. By changing the position of the eccentric cam 112 relative to the motor holding body 111 and pressing the inner surface of the heat transfer tube 66 with the motor holding body 111 and the eccentric cam 112 as depicted in FIG. 9, the sensor holding part 110A is engageable with the inner surface of the heat transfer tube 66.

In the supporting force inspection devices 100A to 100D of the embodiments depicted in FIGS. 4 to 7, the acceleration sensor 116 is configured to detect the vibration state of the U bend portion 68 while corresponding one of the sensor holding parts 110A to 110D is engaged with the inner surface of the heat transfer tube 66. Accordingly, for instance, by causing corresponding one of the sensor holding parts 110A to 100D to be engaged with the inner surface of the heat transfer tube 66 at the position of interposition of the anti-vibration member 69 and detecting the vibration state of the U bend portion 68, it is possible to accurately inspect the supporting force F of the anti-vibration member 69 to support the heat transfer tube 66 in the in-plane direction.

Figure 8:
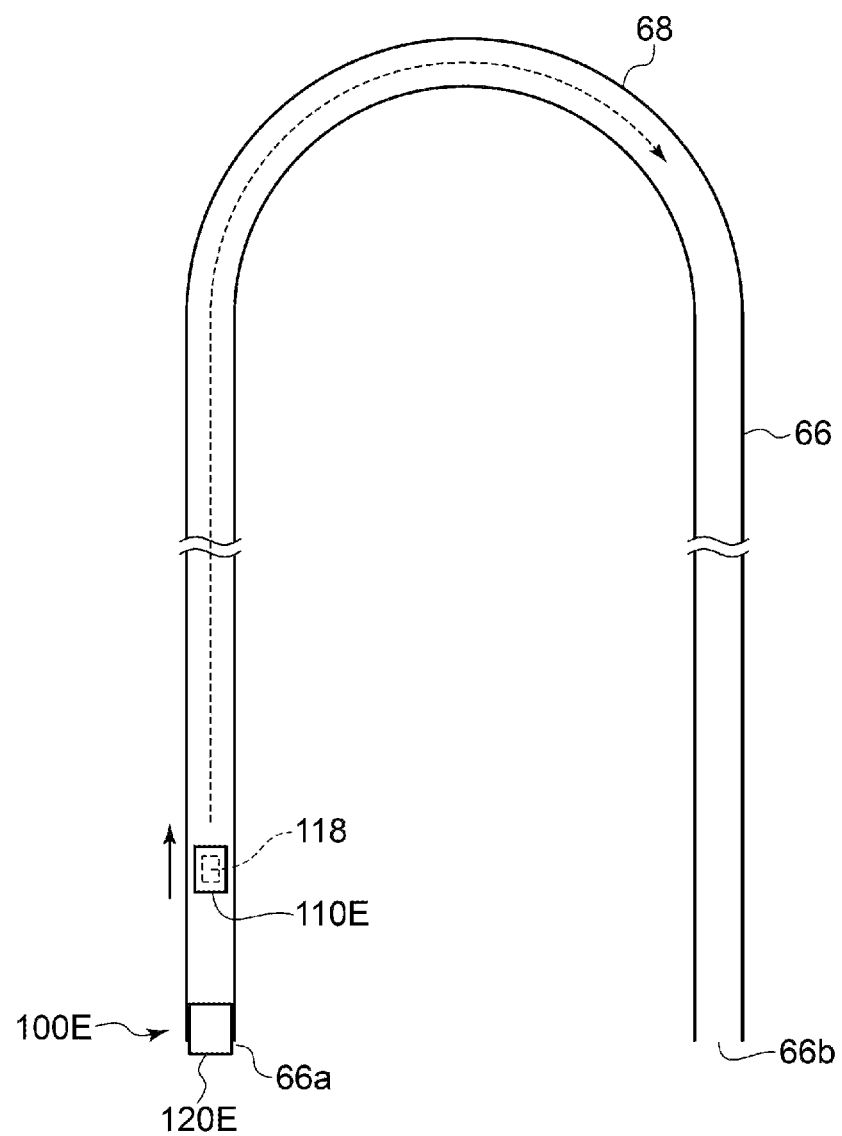
FIG. 8 is a schematic diagram showing the configuration of a supporting force inspection device according to an embodiment.

In the supporting force inspection device 100E according to the embodiment depicted in FIG. 8, the acceleration sensor 116 is configured to detect the vibration state of the U bend portion 68 while the sensor holding part 110E is moving inside the heat transfer tube 66.

Hereinafter, the supporting force inspection device 100A according to an embodiment depicted in FIG. 4 will be described in more detail.

The sensor holding part 110A according to an embodiment is configured to close the inside of the heat transfer tube 66 while being engaged with the inner surface of the heat transfer tube 66. That is, for instance, the sensor holding part 110A according to an embodiment is configured such that, of the outer surface of the motor holding body 111 and the eccentric cam 112, a part of a portion that is in contact with the inner peripheral surface of the heat transfer tube 66 is constituted by a member having elasticity such as rubber. Thus, when the inner surface of the heat transfer tube 66 is pressed by the motor holding body 111 and the eccentric cam 112 so that the sensor holding part 110A is engaged with the inner surface of the heat transfer tube 66, the above member having elasticity warps and makes close contact with the inner peripheral surface of the heat transfer tube 66. Thus, the sensor holding part 110A according to an embodiment is capable of closing the inside of the heat transfer tube 66 by being engaged with the inner surface of the heat transfer tube 66.

The vibration force generation part 120A according to an embodiment is configured such that a non-depicted piston that reciprocates inside a non-depicted cylinder presses a liquid inside the cylinder, so as to apply pressure to a liquid 191 such as water filling the inside the heat transfer tube 66 closed by the sensor holding part 110A so that the pressure changes with time.

Hereinafter, the procedure to inspect the supporting force using the supporting force inspection device 100A according to an embodiment depicted in FIG. 4 will be described.

Figure 4:
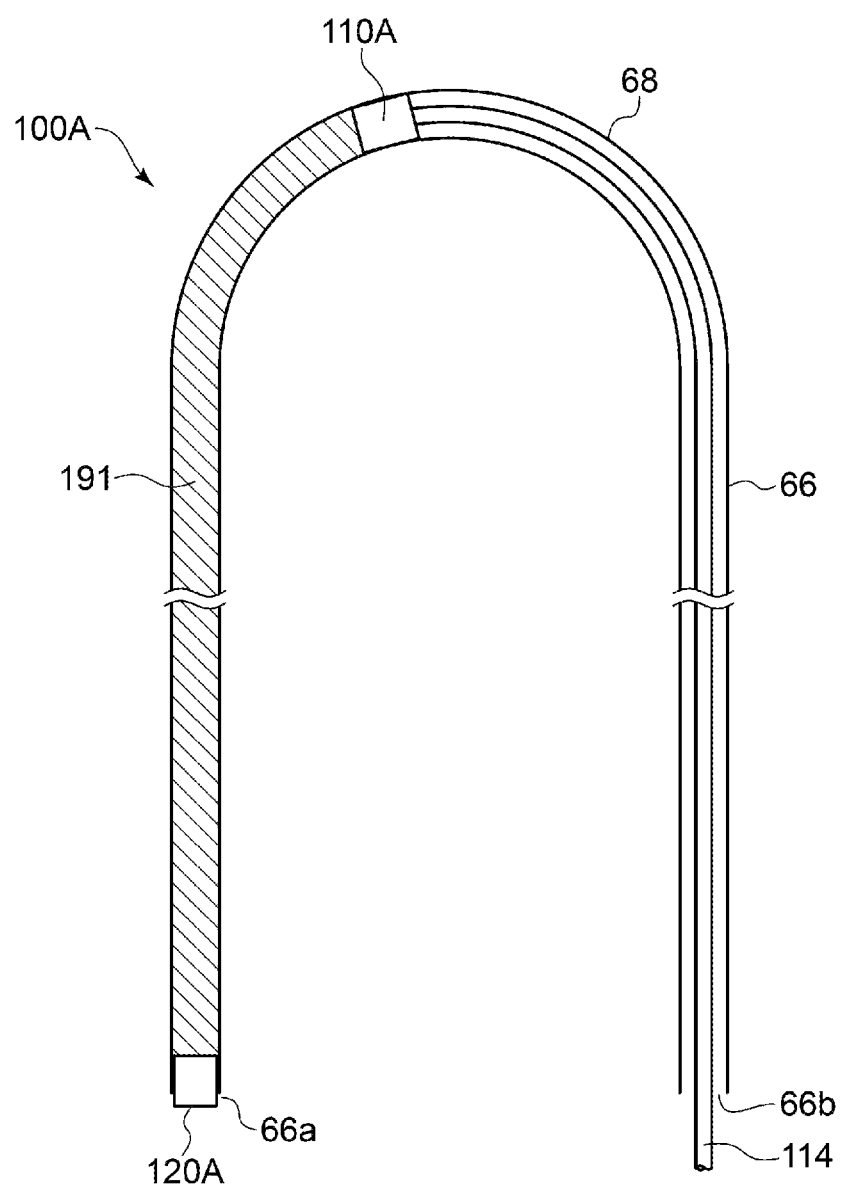
FIG. 4 is a schematic diagram showing the configuration of a supporting force inspection device according to an embodiment.

In a case where the supporting force of the anti-vibration member 69 is inspected by using the supporting force inspection device 100A according to an embodiment depicted in FIG. 4, firstly, as a placement step, the sensor holding part 110A is placed inside the heat transfer tube 66. Specifically, for instance, the sensor holding part 110A is inserted into the heat transfer tube 66 from one of the inlet-side lower end portion 66a or the outlet-side lower end portion 66b of the heat transfer tube 66 to be inspected. Furthermore, in the example depicted in FIG. 4, the sensor holding part 110A is inserted into the heat transfer tube 66 from the outlet-side lower end portion 66b of the heat transfer tube 66 to be inspected.

Further, for instance, by pushing the flexible cable 114 in, the sensor holding part 110A is moved to the position, of the plurality of anti-vibration members 69, where the outer peripheral surface is supported by the anti-vibration member 69 to be inspected. Further, the arrival position of the sensor holding part 110A inside the heat transfer tube 66 can be determined on the basis of the design information of the steam generator 13 and the insertion length of the flexible cable 114 into the heat transfer tube 66. Furthermore, the position at which the anti-vibration member 69 supports the outer peripheral surface of the heat transfer tube 66 can be known from the design information of the steam generator 13.

After moving the sensor holding part 110A to the desired position, when the inner surface of the heat transfer tube 66 is pressed by the motor holding body 111 and the eccentric cam 112 as described above, the sensor holding part 110A is engaged with the inner surface of the heat transfer tube 66. Accordingly, as described above, the sensor holding part 110A according to an embodiment closes the inside of the heat transfer tube 66.

Furthermore, the vibration force generation part 120A is attached to the other one of the inlet-side lower end portion 66a or the outlet-side lower end portion 66b of the heat transfer tube 66 to be inspected. Furthermore, in the example depicted in FIG. 4, the vibration force generation part 120A is disposed at the inlet-side lower end portion 66a of the heat transfer tube 66 to be inspected.

Next, as a vibration step, the heat transfer tube 66 is vibrated along a plane in which the curvature circle of the U bend portion 68 exists, that is, in the in-plane direction. Specifically, the liquid 191 such as water is filled inside the heat transfer tube 66 that is closed by the sensor holding part 110A and the vibration force generation part 120A. Further, the heat transfer tube 66 is vibrated in the in-plane direction by applying pressure with the vibration force generation part 120A to the liquid 191 filling the inside of the heat transfer tube 66 so that the pressure changes with time. That is, in the vibration step, the vibration force generation part 120A suitably sweeps the frequency of the pressure applied to the liquid 191 filling the inside of the heat transfer tube 66, that is, the vibration force.

As described above, by applying pressure to the liquid 191 filling the inside of the heat transfer tube 66 with the vibration force generation part 120A so that the pressure changes with time, a force that acts to change the curvature is applied to the U bend portion 68, and thus the U bend portion 68 vibrates as if to bend and stretch in the in-plane direction.

Accordingly, in the vibration step, the sensor holding part 110A and the vibration force generation part 120A cooperate and vibrate the heat transfer tube 66 in the in-plane direction.

Figure 11:
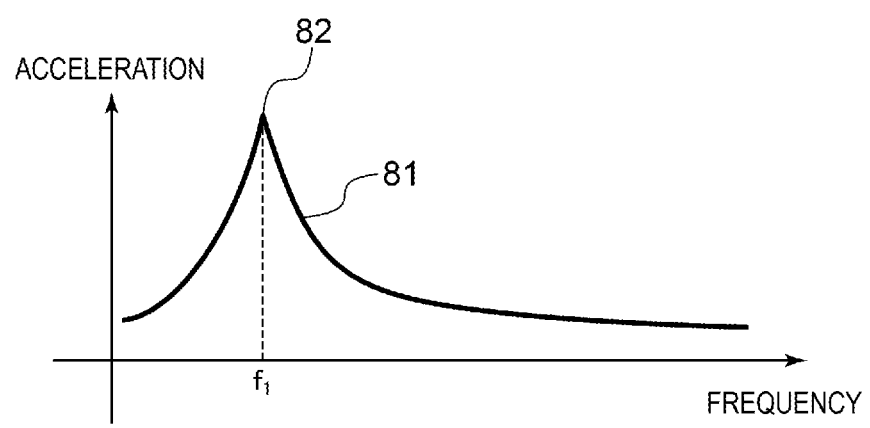
FIG. 11 is an example of a graph showing the relationship between acceleration detected by an acceleration sensor in the acceleration detection step and vibration frequency.

In the acceleration detection step, the vibration state of the U bend portion 68 vibrated in the vibration step is detected by the acceleration sensor 116 held by the sensor holding part 110A. FIG. 11 is an example of a graph showing the relationship between acceleration detected by the acceleration sensor 116 in the acceleration detection step and vibration frequency. On the basis of the detection result of the acceleration sensor 116 in the acceleration detection step, as depicted in FIG. 11 for instance, obtained is a graph 81 having a local maximum value (peak 82) of acceleration at a frequency f1. Further, to simplify the description, in the graph 81 depicted in FIG. 11, the value of acceleration is shown for a single vibration mode, and the influence of other vibration modes is excluded.

In the graph 81 depicted in FIG. 11, the frequency f1 at which the peak 82 appears is the resonance frequency of the heat transfer tube 66 to be inspected, and changes in response to the supporting force F of the anti-vibration member 69 to support the heat transfer tube 66 in the in-plane direction. For instance, the frequency f1 increases as the supporting force F increases, and the frequency f1 decreases as the supporting force F decreases. Thus, in an embodiment, the supporting force F can be estimated from the value of the frequency f1.

Further, in the inspection of the supporting force using the supporting force inspection device 100A according to an embodiment depicted in FIG. 4, the engagement position of the sensor holding part 110A in the tube axial direction of the heat transfer tube 66 is changed suitably, and the supporting force F is inspected for each of the plurality of anti-vibration members 69.

As described above, the supporting force inspection device 100A according to an embodiment depicted in FIG.

4 includes the vibration force generation part 120A that generates a vibration force for vibrating the heat transfer tube 66 in the in-plane direction. The vibration force generation part 120A is configured to cooperate with the sensor holding part 110A and vibrate the heat transfer tube 66 in the in-plane direction, and thus it is possible to vibrate the heat transfer tube 66 in the in-plane direction efficiently. Furthermore, since it is possible to detect the vibration state of the U bend portion 68 with the acceleration sensor 116, it is possible to accurately inspect the supporting force F of the anti-vibration member 69 in the in-plane direction from the vibration state of the U bend portion 68 detected by the acceleration sensor 116.

With the supporting force inspection device 100A according to an embodiment depicted in FIG. 4, it is possible to detect the vibration state of the U bend portion 68 with the acceleration sensor 116 while the sensor holding part 110A is being engaged with the inner peripheral surface of the heat transfer tube 66, and thus, for instance, by causing the sensor holding part 110A to be engaged with the inner surface of the heat transfer tube 66 at the position of interposition of the anti-vibration member 69 and detecting the vibration state, it is possible to accurately inspect the supporting force F of the anti-vibration member 69 in the in-plane direction.

The supporting force inspection device 100A according to an embodiment is configured such that, by rotating the eccentric cam 112 relative to the motor holding body 111 with the motor 115 and pressing the inner surface of the heat transfer tube 66 with the motor holding body 111 and the eccentric cam 112, the sensor holding part 110A is engaged with the inner surface of the heat transfer tube 66. Accordingly, it is possible to cause the sensor holding part 110A to be engaged with the inner surface of the heat transfer tube 66 with a simple configuration. Further, since it is possible to cause the sensor holding part 110A to be engaged with the inner surface of the heat transfer tube 66 with a simple configuration, it is possible to reduce the size of the sensor holding part 110A, and it is possible to place the sensor holding part 110A into the heat transfer tube 66 even when the heat transfer tube 66 has a small diameter or when the U bend portion 68 has a small curvature radius.

The supporting force inspection device 100A according to an embodiment depicted in FIG. 4 is configured such that the vibration force generation part 120A is capable of generating a vibration force that changes with time, and thus it is possible to vibrate the heat transfer tube 66 in the in-plane direction efficiently, and improve the accuracy in inspecting the supporting force F of the anti-vibration member 69 in the in-plane direction.

The supporting force inspection device 100A according to an embodiment depicted in FIG. 4 is capable of vibrating the heat transfer tube in the in-plane direction efficiently with the hydrostatic pressure of liquid, and it is possible to improve the inspection accuracy of the supporting force F of the anti-vibration member 69 in the in-plane direction.

Further, by changing the time interval of changing the pressure applied to the liquid, it is possible to change the frequency of the vibration force easily. Accordingly, it is possible to expand the frequency range of the vibration force, and thus it is possible to vibrate the heat transfer tube 66 with a vibration force of various frequencies, which makes it possible to improve the accuracy in inspecting the supporting force F.

Furthermore, by extending the time interval to change the pressure applied to the liquid, it is possible to extend the time interval of generation of the vibration force without lowering the pressure applied to the liquid. Accordingly, even in a region where the frequency of the vibration force is low, it is possible to obtain a sufficient vibration force for vibrating the heat transfer tube 66, and thus it is possible to improve the inspection accuracy of the supporting force F in the low frequency range.

In the supporting force inspection device 100A according to an embodiment depicted in FIG. 4, the sensor holding part 110A is configured so as to close the inside of the heat transfer tube 66 while being engaged with the inner peripheral surface of the heat transfer tube 66, and thus it is not necessary to prepare another member or the like for closing the inside of the heat transfer tube 66 and fix the member inside the heat transfer tube 66. Accordingly, it is possible to simplify the configuration of the supporting force inspection device 100A.

Hereinafter, the supporting force inspection device 100B according to another embodiment depicted in FIG. 5 will be described in more detail.

The vibration force generation part 120B according to another embodiment is configured to emit a projectile 102B into the heat transfer tube 66 in the tube axial direction toward the sensor holding part 110B that is engaged with the inner peripheral surface of the heat transfer tube 66.

The sensor holding part 110B according to another embodiment is configured to vibrate the heat transfer tube 66 in the in-plane direction by transmitting the impulse force generated from collision with the projectile 102B to the heat transfer tube 66.

That is, the vibration force generation part 120B according to another embodiment is configured to be capable of emitting the projectile 102B that the vibration force generation part 120B holds in the tube axial direction of the heat transfer tube 66, by using a driving force, which is, for instance, pressure of compressed air, a biasing force of an elastic member such as a spring, or pressure generated by combustion or explosion of gunpowder.

The projectile 102B is a member having a weight that is suitably set taking into account the impulse force that the projectile 102B applies to the sensor holding part 110B. Further, by using a plurality of emission bodies 102B that are linked so as to be capable of bending inside the U bend portion 68, the impulse force applied to the sensor holding part 110B may be increased.

Hereinafter, the procedure to inspect the supporting force using the supporting force inspection device 100B according to another embodiment depicted in FIG. 5 will be described.

Figure 5:
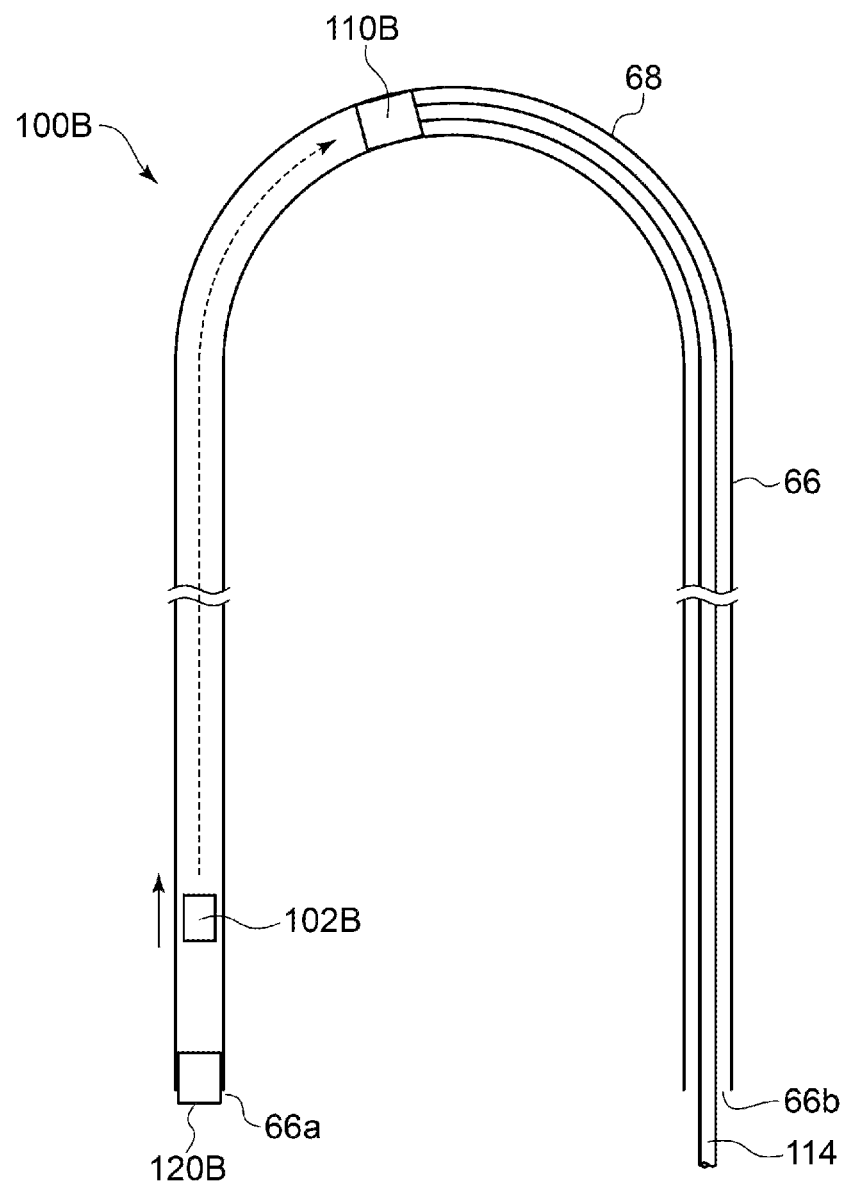
FIG. 5 is a schematic diagram showing the configuration of a supporting force inspection device according to an embodiment.

In a case where the supporting force of the anti-vibration member 69 is inspected by using the supporting force inspection device 100B according to another embodiment depicted in FIG. 5, firstly, as a placement step, the sensor holding part 110B according to another embodiment is placed inside the heat transfer tube 66. Specifically, similarly to the sensor holding part 110A according to an embodiment depicted in FIG. 4, after moving the sensor holding part 110B to a desired position inside the heat transfer tube 66, the sensor holding part 110B is engaged with the inner surface of the heat transfer tube 66.

Furthermore, the vibration force generation part 120B according to another embodiment that holds the projectile 102B is attached to the other one of the inlet-side lower end portion 66a or the outlet-side lower end portion 66b of the heat transfer tube 66 to be inspected. Furthermore, in the example depicted in FIG. 5, the vibration force generation part 120B is disposed at the inlet-side lower end portion 66a of the heat transfer tube 66 to be inspected.

Next, as a vibration step, the heat transfer tube 66 is vibrated in the in-plane direction. Specifically, the vibration force generation part 120B emits the projectile 102B into the heat transfer tube 66 in the tube axial direction toward the sensor holding part 110B that is engaged with the inner surface of the heat transfer tube 66. Then, the projectile 102B hits the sensor holding part 110B.

The sensor holding part 110B transmits the impulse force generated from collision with the projectile 102B to the heat transfer tube 66. Accordingly, an impulse input is applied to the heat transfer tube 66 in the in-plane direction, and the heat transfer tube 66 vibrates in the in-plane direction.

As described above, in the vibration step, the sensor holding part 110B according to another embodiment and the vibration force generation part 120B cooperate and vibrate the heat transfer tube 66 in the in-plane direction.

Figure 12:
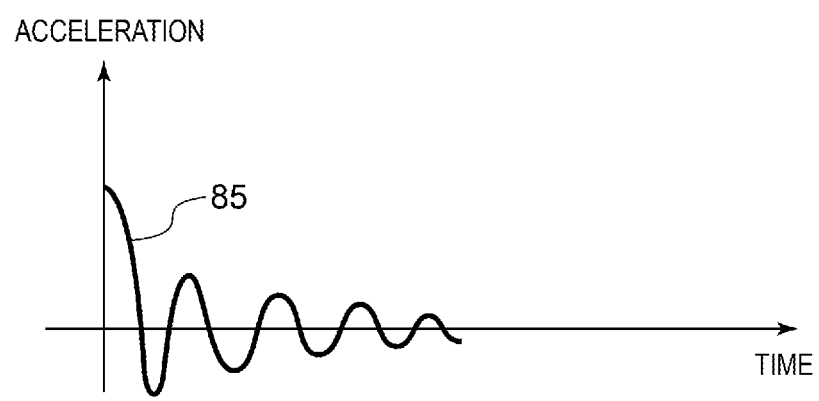
FIG. 12 is an example of a graph showing the temporal transition of residual vibration of the U bend portion detected by the acceleration sensor in the acceleration detection step.

In the acceleration detection step, the vibration state of the U bend portion 68 vibrated in the vibration step, that is, the residual vibration of the U bend portion 68 is detected by the acceleration sensor 116 held by the sensor holding part 110B. FIG. 12 is an example of a graph showing the temporal transition of residual vibration of the U bend portion 68 detected by the acceleration sensor 116 in the acceleration detection step. On the basis of the detection result of the acceleration sensor 116 in the acceleration detection step, as depicted in FIG. 12 for instance, obtained is a graph 85 where the detected residual vibration attenuates gradually with time.

The residual change in the graph 85 depicted in FIG. 12 changes in response to the supporting force F of the anti-vibration member 69 to support the heat transfer tube 66 in the in-plane direction. For instance, the frequency of the residual vibration increases as the supporting force F increases, and the duration of the residual vibration becomes shorter. On the contrary, the frequency of the residual vibration decreases as the supporting force F decreases, and the duration of the residual vibration becomes longer. Thus, in another embodiment depicted in FIG. 5, the supporting force F can be estimated from the frequency of the residual vibration and duration of the residual vibration.

Further, in the inspection of the supporting force using the supporting force inspection device 100B according to another embodiment depicted in FIG. 5, the engagement position of the sensor holding part 110B in the tube axial direction of the heat transfer tube 66 is changed suitably, and the supporting force F is inspected for each of the plurality of anti-vibration members 69.

As described above, the supporting force inspection device 100B according to another embodiment depicted in FIG. 5 includes the vibration force generation part 120B that generates a vibration force for vibrating the heat transfer tube 66 in the in-plane direction. The vibration force generation part 120B is configured to cooperate with the sensor holding part 110B and vibrate the heat transfer tube 66 in the in-plane direction, and thus it is possible to vibrate the heat transfer tube 66 in the in-plane direction efficiently. Furthermore, since it is possible to detect the vibration state of the U bend portion 68 with the acceleration sensor 116, it is possible to accurately inspect the supporting force F of the anti-vibration member 69 in the in-plane direction from the vibration state of the U bend portion 68 detected by the acceleration sensor 116.

In the supporting force inspection device 100B according to another embodiment depicted in FIG. 5, it is possible to detect the vibration state of the U bend portion 68 with the acceleration sensor 116 while the sensor holding part 110B is being engaged with the inner surface of the heat transfer tube 66, and thus, for instance, by causing the sensor holding part 110B to be engaged with the inner surface of the heat transfer tube 66 at the position of interposition of the anti-vibration member 69 and detecting the vibration state, it is possible to accurately inspect the supporting force F of the anti-vibration member 69 in the in-plane direction.

The supporting force inspection device 100B according to another embodiment depicted in FIG. 5 is configured such that, as the motor 115 rotates the eccentric cam 112 relative to the motor holding body 111 and the motor holding body 111 and the eccentric cam 112 press the inner surface of the heat transfer tube 66, the sensor holding part 110B is engaged with the inner surface of the heat transfer tube 66. Accordingly, it is possible to cause the sensor holding part 110B to be engaged with the inner surface of the heat transfer tube 66 with a simple configuration. Further, since it is possible to cause the sensor holding part 110B to be engaged with the inner surface of the heat transfer tube 66 with a simple configuration, it is possible to reduce the size of the sensor holding part 110B, and it is possible to place the sensor holding part 110B inside the heat transfer tube 66 even when the heat transfer tube 66 has a small diameter or when the U bend portion 68 has a small curvature radius.

In the supporting force inspection device 100B according to another embodiment depicted in FIG. 5, the vibration force generation part 120B is configured to emit a projectile 102B into the heat transfer tube 66 in the tube axial direction toward the sensor holding part 110B engaged with the inner surface of the heat transfer tube 66. Further, the sensor holding part 110B is configured to vibrate the heat transfer tube 66 in the in-plane direction by transmitting the impulse force generated from collision with the projectile 102B to the heat transfer tube 66. That is, the vibration force generation part 120B and the sensor holding part 110B are configured to cooperate and vibrate the heat transfer tube in the in-plane direction.

Thus, at the engagement position of the sensor holding part 110B, it is possible to transmit the vibration force in the in-plane direction efficiently to the heat transfer tube 66. Accordingly, for instance, by engaging the sensor holding part 110B with the inner surface of the heat transfer tube 66 at the position of interposition of the anti-vibration member 69, it is possible to transmit the vibration force to the heat transfer tube 66 efficiently at the position of interposition of the anti-vibration member 69, and detect the vibration state of the U bend portion 68 at the position of interposition of the anti-vibration member 69, which makes it possible to accurately inspect the supporting force F of the anti-vibration member 69 in the in-plane direction.

In the supporting force inspection device 100B of another embodiment depicted in FIG. 5, the sensor holding part 110B is configured so as to vibrate the heat transfer tube 66 in the in-plane direction by transmitting the impulse force generated from collision with the projectile 102B to the heat transfer tube 66. Thus, the sensor holding part 110B also functions as a member to transmit vibration to the heat transfer tube 66, and it is possible to simplify the configuration of the supporting force inspection device 100B.

Hereinafter, the supporting force inspection device 100C according to another embodiment depicted in FIG. 6 will be described in more detail.

The vibration force generation part 120C according to another embodiment is held by the sensor holding part 110C, and is configured to apply a vibration force to the sensor holding part 110C.

The sensor holding part 110C according to another embodiment is configured to vibrate the heat transfer tube 66 in the in-plane direction by transmitting the vibration force applied by the vibration force generation part 120C that the sensor holding part 110C holds to the heat transfer tube 66.

Specifically, the vibration force generation part 120C according to another embodiment is configured to obtain a reaction force by emitting a projectile 102C, and apply a vibration force to the sensor holding part 110C.

That is, the vibration force generation part 120C according to another embodiment is configured to be capable of emitting the projectile 102C that the vibration force generation part 120C holds in the tube axial direction of the heat transfer tube 66, by using a driving force, which is, for instance, pressure of compressed air, a biasing force of an elastic member such as a spring, or pressure generated by combustion or explosion of gunpowder.

The projectile 102C is a member having a weight that is suitably set taking into account the vibration force that the projectile 102C applies to the sensor holding part 110C. Further, by using a plurality of emission bodies 102C linked so as to be capable of bending inside the U bend portion 68, the vibration force that the projectile 102C applies to the sensor holding part 110C may be increased.

Hereinafter, the procedure to inspect the supporting force using the supporting force inspection device 100C according to another embodiment depicted in FIG. 6 will be described.

Figure 6:
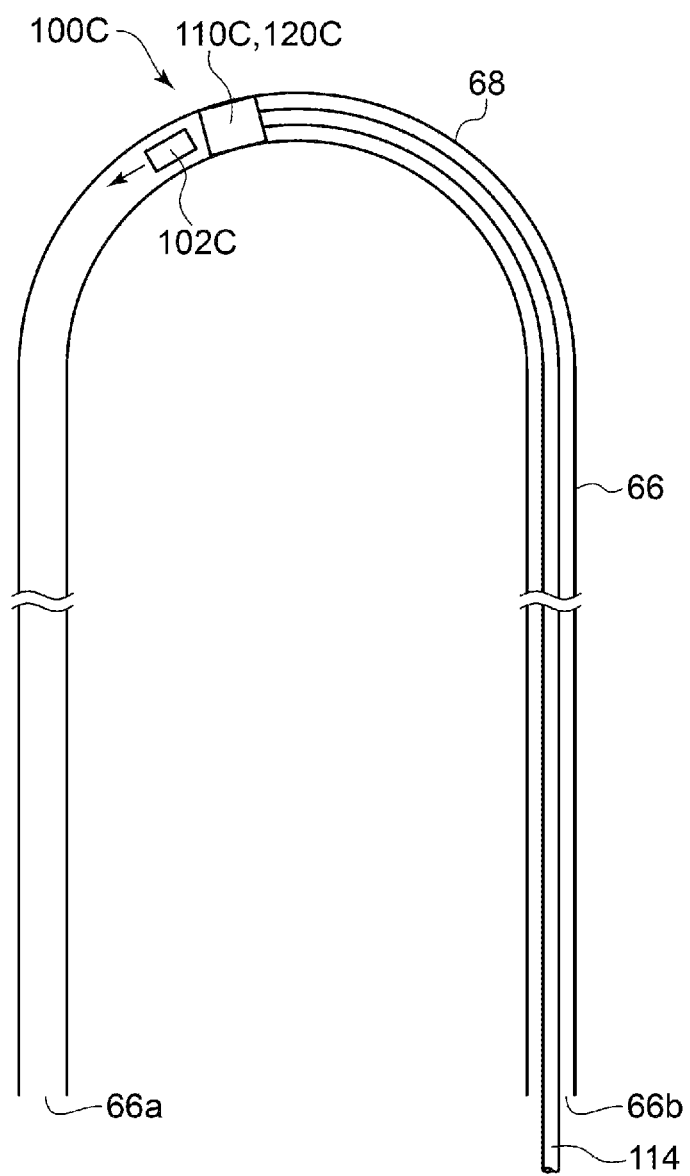
FIG. 6 is a schematic diagram showing the configuration of a supporting force inspection device according to an embodiment.

In a case where the supporting force of the anti-vibration member 69 is inspected by using the supporting force inspection device 100C according to another embodiment depicted in FIG. 6, firstly, as a placement step, the sensor holding part 110C holding the vibration force generation part 120C according to another embodiment is placed inside the heat transfer tube 66. Specifically, similarly to the sensor holding part 110A according to an embodiment depicted in FIG. 4, after moving the sensor holding part 110C to a desired position inside the heat transfer tube 66, the sensor holding part 110C is engaged with the inner surface of the heat transfer tube 66. Further, the projectile 102C is held in advance by the vibration force generation part 120C according to another embodiment.

Next, as a vibration step, the heat transfer tube 66 is vibrated in the in-plane direction. Specifically, the vibration force generation part 120C emits the projectile 102C inside the heat transfer tube 66 in the tube axial direction.

The sensor holding part 110C transmits a reaction force generated from emission of the projectile 102C by the vibration force generation part 120C to the heat transfer tube 66 as a vibration force. Accordingly, an impulse input is applied to the heat transfer tube 66 in the in-plane direction, and thus the heat transfer tube 66 vibrates in the in-plane direction.

Accordingly, in the vibration step, the sensor holding part 110C according to another embodiment and the vibration force generation part 120C cooperate and vibrate the heat transfer tube 66 in the in-plane direction.

In the acceleration detection step, the vibration state of the U bend portion 68 vibrated in the vibration step, that is, the residual vibration of the U bend portion 68 is detected by the acceleration sensor 116 held by the sensor holding part 110C. In the supporting force inspection device 100C according to another embodiment depicted in FIG. 6, similarly to the supporting force inspection device 100B according to another embodiment depicted in FIG. 5, on the basis of the detection result of the acceleration sensor 116 in the acceleration detection step, as depicted in FIG. 12 for instance, obtained is a graph 85 where the detected residual vibration attenuates gradually with time.

Thus, in another embodiment depicted in FIG. 6, similarly to another embodiment depicted in FIG. 5, the supporting force F can be estimated from the frequency of the residual vibration and duration of the residual vibration.

Further, in the inspection of the supporting force using the supporting force inspection device 100C according to another embodiment depicted in FIG. 6, the engagement position of the sensor holding part 110C in the tube axial direction of the heat transfer tube 66 is changed suitably, and the supporting force F is inspected for each of the plurality of anti-vibration members 69.

As described above, the supporting force inspection device 100C according to another embodiment depicted in FIG. 6 includes the vibration force generation part 120C that generates a vibration force for vibrating the heat transfer tube 66 in the in-plane direction. The vibration force generation part 120C is configured to cooperate with the sensor holding part 110C and vibrate the heat transfer tube 66 in the in-plane direction, and thus it is possible to vibrate the heat transfer tube 66 in the in-plane direction efficiently. Furthermore, since it is possible to detect the vibration state of the U bend portion 68 with the acceleration sensor 116, it is possible to accurately inspect the supporting force F of the anti-vibration member 69 in the in-plane direction from the vibration state of the U bend portion 68 detected by the acceleration sensor 116.

In the supporting force inspection device 100C according to another embodiment depicted in FIG. 6, it is possible to detect the vibration state of the U bend portion 68 with the acceleration sensor 116 while the sensor holding part 110C is being engaged with the inner surface of the heat transfer tube 66, and thus, for instance, by causing the sensor holding part 110C to be engaged with the inner surface of the heat transfer tube 66 at the position of interposition of the anti-vibration member 69 and detecting the vibration state, it is possible to accurately inspect the supporting force F of the anti-vibration member 69 in the in-plane direction.

The supporting force inspection device 100C according to another embodiment depicted in FIG. 6 is configured such that, by rotating the eccentric cam 112 relative to the motor holding body 111 with the motor 115 and pressing the inner surface of the heat transfer tube 66 with the motor holding body 111 and the eccentric cam 112, the sensor holding part 110C is engaged with the inner surface of the heat transfer tube 66. Accordingly, it is possible to cause the sensor holding part 110C to be engaged with the inner surface of the heat transfer tube 66 with a simple configuration. Further, since it is possible to cause the sensor holding part 110C to be engaged with the inner surface of the heat transfer tube 66 with a simple configuration, it is possible to reduce the size of the sensor holding part 110C, and it is possible to place the sensor holding part 110C inside the heat transfer tube 66 even when the heat transfer tube 66 has a small diameter or when the U bend portion 68 has a small curvature radius.

In the supporting force inspection device 100C according to another embodiment depicted in FIG. 6, the sensor holding part 110C holds the vibration force generation part 120C, and the sensor holding part 110C is configured to vibrate the heat transfer tube 66 in the in-plane direction by transmitting a vibration force applied by the vibration force generation part 120C that the sensor holding part 110C holds to the heat transfer tube 66. That is, the vibration force generation part 120C and the sensor holding part 110C are configured to cooperate and vibrate the heat transfer tube in the in-plane direction.

Thus, at the engagement position of the sensor holding part 110C, it is possible to transmit the vibration force in the in-plane direction efficiently to the heat transfer tube 66.

Accordingly, for instance, by causing the sensor holding part 110C to be engaged with the inner surface of the heat transfer tube 66 at the position of interposition of the anti-vibration member 69, it is possible to transmit the vibration force to the heat transfer tube 66 efficiently at the position of interposition of the anti-vibration member 69, and detect the vibration state of the U bend portion 68 at the position of interposition of the anti-vibration member 69, which makes it possible to accurately inspect the supporting force F of the anti-vibration member 69 in the in-plane direction.

In the supporting force inspection device 100C of another embodiment depicted in FIG. 6, the sensor holding part 110C is configured so as to vibrate the heat transfer tube 66 in the in-plane direction by transmitting the vibration force obtained by emitting the projectile 102C to the heat transfer tube 66. Thus, the sensor holding part 110C also functions as a member to transmit vibration to the heat transfer tube 66, and it is possible to simplify the configuration of the supporting force inspection device 100C.

In the supporting force inspection device 100C according to another embodiment depicted in FIG. 6, the vibration force generation part 120C is configured to apply a vibration force to the sensor holding part 110C by emitting the projectile 102C, and thus it is possible to generate a vibration force efficiently with a simple configuration, and reduce the size of the vibration force generation part 120C.

Hereinafter, the supporting force inspection device 100D according to another embodiment depicted in FIG. 7 will be described in more detail.

The vibration force generation part 120D according to another embodiment is held by the sensor holding part 110D, and is configured to apply a vibration force to the sensor holding part 110D.

The sensor holding part 110D according to another embodiment is configured to vibrate the heat transfer tube 66 in the in-plane direction by transmitting a vibration force applied by the vibration force generation part 120D that the sensor holding part 110C holds to the heat transfer tube 66.

Specifically, the vibration force generation part 120D according to another embodiment is configured to obtain a reaction force by injecting a fluid 103D intermittently in the tube axial direction, and apply a vibration force to the sensor holding part 110D so that the magnitude of the vibration force changes with time.

That is, the vibration force generation part 120D according to another embodiment is configured to obtain a reaction whose magnitude changes with time and which is generated from intermittent injection of the fluid 103D, that is, gas such as compressed air or liquid such as water, and transmit the reaction force to the sensor holding part 110D.

Furthermore, the vibration force generation part 120D according to another embodiment may obtain a reaction force whose magnitude changes with time by intermittently injecting the fluid 103D, or may obtain a reaction force whose magnitude changes with time by changing the injection amount or the injection pressure of the fluid 103D with time, for instance. Further, the vibration force generation part 120D according to another embodiment may be configured to switch the direction of injection of the fluid 103D with time between one side and the other side of the tube axial direction, thereby obtaining a reaction force whose direction of action also changes with time in addition to the magnitude.

Hereinafter, the procedure to inspect the supporting force using the supporting force inspection device 100D according to another embodiment depicted in FIG. 7 will be described.

Figure 7:
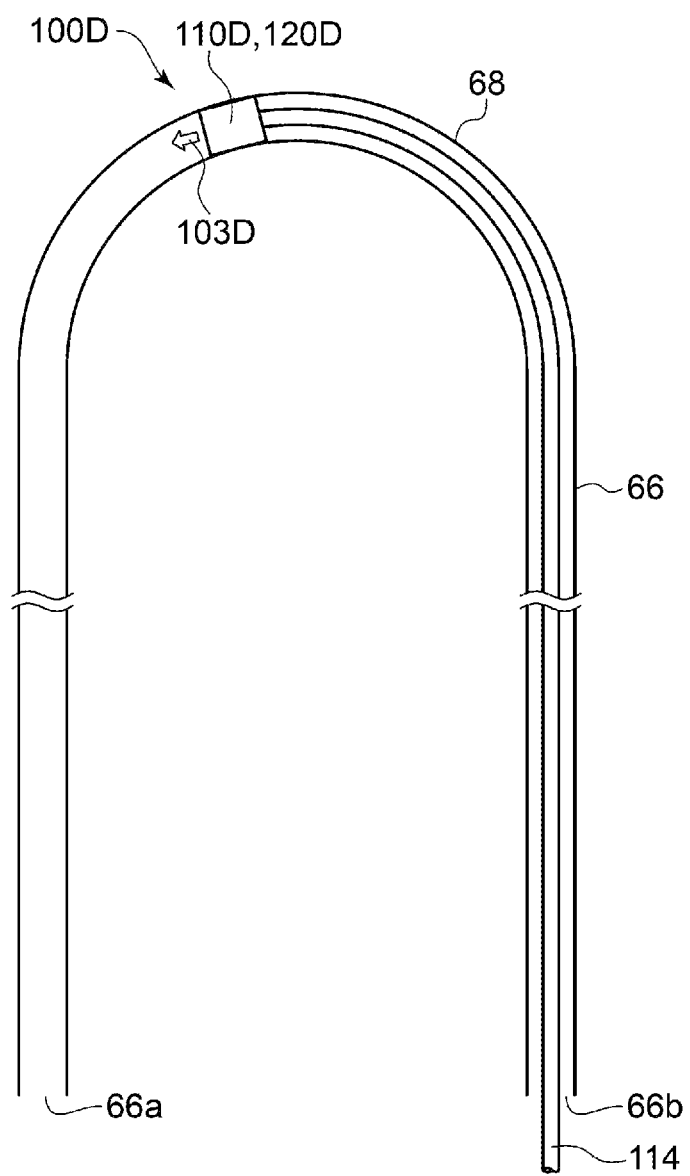
FIG. 7 is a schematic diagram showing the configuration of a supporting force inspection device according to an embodiment.

In a case where the supporting force of the anti-vibration member 69 is inspected by using the supporting force inspection device 100D according to another embodiment depicted in FIG. 7, firstly, as a placement step, the sensor holding part 110D holding the vibration force generation part 120D according to another embodiment is placed inside the heat transfer tube 66. Specifically, similarly to the sensor holding part 110A according to an embodiment depicted in FIG. 4, after moving the sensor holding part 110D to a desired position inside the heat transfer tube 66, the sensor holding part 110D is engaged with the inner peripheral surface of the heat transfer tube 66.

Next, as a vibration step, the heat transfer tube 66 is vibrated in the in-plane direction. Specifically, the vibration force generation part 120D injects a fluid 103D intermittently in the tube axial direction. Specifically, in the vibration step, the vibration force generation part 120D suitably changes the injection duration per one injection or the time before starting the next injection after stopping injection, that is, the injection interval, and thereby suitably sweeps the frequency of the reaction force applied to the sensor holding part 110D, that is, the frequency of the vibration force.

The sensor holding part 110D transmits the reaction force generated from intermittent injection of the fluid 130D in the tube axial direction by the vibration force generation part 120D to the heat transfer tube 66 as a vibration force. Accordingly, the heat transfer tube 66 vibrates in the in-plane direction.

As described above, in the vibration step, the sensor holding part 110D according to another embodiment and the vibration force generation part 120D cooperate and vibrate the heat transfer tube 66 in the in-plane direction.

In the acceleration detection step, the vibration state of the U bend portion 68 vibrated in the vibration step is detected by the acceleration sensor 116 held by the sensor holding part 110D. In the supporting force inspection device 100D according to another embodiment depicted in FIG. 7, similarly to the supporting force inspection device 100A according to an embodiment depicted in FIG. 4, on the basis of the detection result of the acceleration sensor 116 in the acceleration detection step, as depicted in FIG. 11 for instance, obtained is a graph 81 having a local maximum value (peak 82) of acceleration at a frequency f1.

Thus, in another embodiment depicted in FIG. 7, similarly to the embodiment depicted in FIG. 4, the supporting force F can be estimated from the value of the frequency f1.

Furthermore, in the inspection of the supporting force using the supporting force inspection device 100D according to another embodiment depicted in FIG. 7, the engagement position of the sensor holding part 110D in the tube axial direction of the heat transfer tube 66 is changed suitably, and the supporting force F is inspected for each of the plurality of anti-vibration members 69.

As described above, the supporting force inspection device 100D according to another embodiment depicted in FIG. 7 includes the vibration force generation part 120D that generates a vibration force for vibrating the heat transfer tube 66 in the in-plane direction. The vibration force generation part 120D is configured to cooperate with the sensor holding part 110D and vibrate the heat transfer tube 66 in the in-plane direction, and thus it is possible to vibrate the heat transfer tube 66 in the in-plane direction efficiently. Furthermore, since it is possible to detect the vibration state of the U bend portion 68 with the acceleration sensor 116, it is possible to accurately inspect the supporting force F of the anti-vibration member 69 in the in-plane direction from the vibration state of the U bend portion 68 detected by the acceleration sensor 116.

In the supporting force inspection device 100D according to another embodiment depicted in FIG. 7, it is possible to detect the vibration state of the U bend portion 68 with the acceleration sensor 116 while the sensor holding part 110D is being engaged with the inner peripheral surface of the heat transfer tube 66, and thus, for instance, by causing the sensor holding part 110D to be engaged with the inner surface of the heat transfer tube 66 at the position of interposition of the anti-vibration member 69 and detecting the vibration state, it is possible to accurately inspect the supporting force F of the anti-vibration member 69 in the in-plane direction.

The supporting force inspection device 100D according to another embodiment depicted in FIG. 7 is configured such that, by rotating the eccentric cam 112 relative to the motor holding body 111 with the motor 115 and pressing the inner surface of the heat transfer tube 66 with the motor holding body 111 and the eccentric cam 112, the sensor holding part 110D is engaged with the inner surface of the heat transfer tube 66. Accordingly, it is possible to cause the sensor holding part 110D to be engaged with the inner surface of the heat transfer tube 66 with a simple configuration. Furthermore, since it is possible to cause the sensor holding part 110D to be engaged with the inner surface of the heat transfer tube 66 with a simple configuration, it is possible to reduce the size of the sensor holding part 110D, and it is possible to place the sensor holding part 110D into the heat transfer tube 66 even when the heat transfer tube 66 has a small diameter or when the U bend portion 68 has a small curvature radius.

In the supporting force inspection device 100D according to another embodiment depicted in FIG. 7, the sensor holding part 110D holds the vibration force generation part 120D, and the sensor holding part 110D is configured to vibrate the heat transfer tube 66 in the in-plane direction by transmitting a vibration force applied by the vibration force generation part 120D to the heat transfer tube 66. That is, the vibration force generation part 120D and the sensor holding part 110D are configured to cooperate and vibrate the heat transfer tube in the in-plane direction.

Thus, at the engagement position of the sensor holding part 110D, it is possible to transmit the vibration force in the in-plane direction efficiently to the heat transfer tube 66. Accordingly, for instance, by engaging the sensor holding part 110D with the inner surface of the heat transfer tube 66 at the position of interposition of the anti-vibration member 69, it is possible to transmit the vibration force to the heat transfer tube 66 efficiently at the position of interposition of the anti-vibration member 69, and detect the vibration state of the U bend portion 68 at the position of interposition of the anti-vibration member 69, which makes it possible to accurately inspect the supporting force F of the anti-vibration member 69 in the in-plane direction.

In the supporting force inspection device 100D of another embodiment depicted in FIG. 7, the sensor holding part 110D is configured so as to vibrate the heat transfer tube 66 in the in-plane direction by transmitting the vibration force obtained by injecting the fluid 103D intermittently to the heat transfer tube 66. Thus, the sensor holding part 110D also functions as a member to transmit vibration to the heat transfer tube 66, and it is possible to simplify the configuration of the supporting force inspection device 100D.

In the supporting force inspection device 100D according to another embodiment depicted in FIG. 7, the vibration force generation part 120D is configured to apply a vibration force to the sensor holding part 110D so that the magnitude of the vibration force changes with time by injecting the fluid 103D, and thus it is possible to generate a vibration force efficiently with a simple configuration, and reduce the size of the vibration force generation part 120D.

Further, by changing the time interval of changing the injection amount of the fluid 103D, it is possible to change the frequency of the vibration force easily. Accordingly, it is possible to expand the frequency range of the vibration force, and thus it is possible to vibrate the heat transfer tube with a vibration force of various frequencies, which makes it possible to improve the inspection accuracy of the supporting force F.

Furthermore, by extending the time interval to change the injection amount of the fluid 103D, it is possible to extend the time interval of generation of the reaction force without lowering the magnitude of the reaction force generated from injection of the fluid 103D. Accordingly, even in a region where the frequency of the vibration force is low, it is possible to obtain a sufficient vibration force for vibrating the heat transfer tube 66, and thus it is possible to improve the accuracy in inspecting the supporting force F in the low frequency range.

Hereinafter, the supporting force inspection device 100E according to another embodiment depicted in FIG. 8 will be described in more detail.

The acceleration sensor 116 according to another embodiment is configured to detect the vibration state of the U bend portion 68 while the sensor holding part 110E is moving inside the heat transfer tube 66.

The vibration force generation part 120E according to another embodiment is configured to emit the sensor holding part 110E in the tube axial direction through the heat transfer tube 66.

The sensor holding part 110E according to another embodiment is configured to vibrate the heat transfer tube 66 in the in-plane direction by moving through the heat transfer tube 66 while sliding on the U bend portion 68.

Specifically, similarly to the vibration force generation part 120B of the supporting force inspection device 100B of another embodiment depicted in FIG. 5, the vibration force generation part 120E according to another embodiment is configured to be capable of emitting the sensor holding part 110E that the vibration force generation part 120E holds in the tube axial direction of the heat transfer tube 66, by using a driving force, which is, for instance, pressure of compressed air, a biasing force of an elastic member such as a spring, or pressure generated by combustion or explosion of gunpowder.

The sensor holding part 110E according to another embodiment is a member similar to the projectile 102B of the supporting force inspection device 100B of another embodiment depicted in FIG. 5, and holds, for instance, an acceleration sensor 118, and a non-depicted storage portion for storing output from the acceleration sensor 118. The sensor holding part 110E is a member having a weight that is suitably set taking into account the vibration force applied to the heat transfer tube 66 as described below.

Hereinafter, the procedure to inspect the supporting force using the supporting force inspection device 100E according to another embodiment depicted in FIG. 8 will be described.

In a case where the supporting force of the anti-vibration member 69 is inspected by using the supporting force inspection device 100E according to another embodiment depicted in FIG. 8, firstly, as a placement step, the vibration force generation part 120E according to another embodiment holding the sensor holding part 110E is attached to one of the inlet-side lower end portion 66a or the outlet-side lower end portion 66b of the heat transfer tube 66 to be inspected. Furthermore, in the example depicted in FIG. 8, the vibration force generation part 120E is disposed at the inlet-side lower end portion 66a of the heat transfer tube 66 to be inspected.

Next, as a vibration step, the heat transfer tube 66 is vibrated in the in-plane direction. Specifically, the vibration force generation part 120E injects a sensor holding part 110E into the heat transfer tube 66.

The sensor holding part 110E mainly transmits a centrifugal force to the heat transfer tube 66 when passing the U bend portion 68. Accordingly, the heat transfer tube 66 vibrates in the in-plane direction.

Accordingly, in the vibration step, the sensor holding part 110E according to another embodiment and the vibration force generation part 120E cooperate and vibrate the heat transfer tube 66 in the in-plane direction.

In the acceleration detection step, the vibration state of the U bend portion 68 vibrated in the vibration step is detected by the acceleration sensor 118 held by the sensor holding part 110E. That is, in the acceleration detection step, the sensor holding part 110E stores, in a non-depicted storage portion, acceleration detected by the acceleration sensor 118 when passing the U bend portion 68.

The sensor holding part 110E emitted from the vibration force generation part 120E is emitted outside the heat transfer tube 66 from the other one of the inlet-side lower end portion 66a or the outlet-side lower end portion 66b of the heat transfer tube 66 to be inspected. The vibration force generation part 120E emitted outside the heat transfer tube 66 is recovered, and the data stored in the non-depicted storage part of the vibration force generation part 120E is sent to an external device, for instance. Accordingly, it is possible to obtain the data of acceleration detected by the acceleration sensor 118 when the sensor holding part 110E passes the U bend portion 68.

Figure 13:
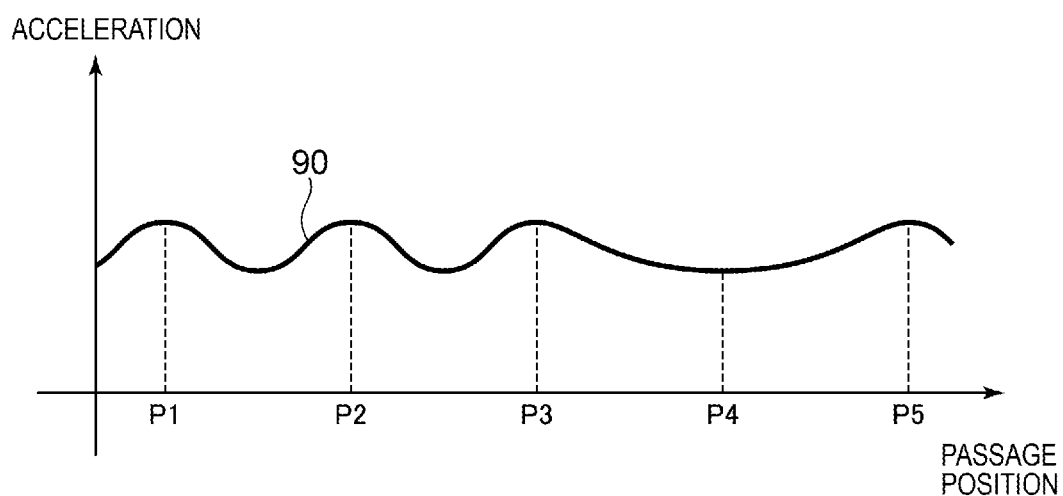
FIG. 13 is an example of a graph showing acceleration detected by an acceleration sensor in the acceleration detection step.

FIG. 13 is an example of a graph showing acceleration detected by the acceleration sensor 118 in the acceleration detection step. In the graph 90 shown in FIG. 13, x-axis is the passage position of the sensor holding part 110E in the heat transfer tube 66, and y-axis is acceleration detected by the acceleration sensor 118.

In FIG. 13, the positions P1 to P5 on x-axis are positions where the anti-vibration members 69 are disposed on the outer peripheral surface of the heat transfer tube 66.

In the graph 90 of FIG. 13, of the positions of the anti-vibration members 69 on the outer peripheral surface of the heat transfer tube 66, the value of acceleration reaches its local maximum at positions P1 to P3, and P5. This is because, at the positions where the anti-vibration members 69 are positioned on the outer peripheral surface of the heat transfer tube 66, the supporting force F of the anti-vibration members 69 in the in-plane direction limits movement of the U bend portion 68 in the in-plane direction caused by the centrifugal force from the sensor holding part 110E, and thus the centripetal force that the sensor holding part 110E receives from the U bend portion 68 increases.

Furthermore, in the graph 90 of FIG. 13, of the positions of the anti-vibration members 69 on the outer peripheral surface of the heat transfer tube 66, the value of acceleration does not show a clear peak at position P4, unlike at other positions P1 to P3 and P5. This is because, at position P4, the supporting force F of the anti-vibration member 69 in the in-plane direction is lower than those at other positions P1 to P3 and P5, and thus the U bend portion 68 is more likely to move in the in-plane direction, and the centripetal force that the sensor holding part 110E receives from the U bend portion 68 decreases.

As described above, in another embodiment depicted in FIG. 8, on the basis of the graph 90 depicted in FIG. 13, the supporting force F can be estimated from acceleration at a position of the anti-vibration member 69 disposed on the outer peripheral surface of the heat transfer tube 66.

Further, in the inspection of the supporting force using the supporting force inspection device 100E according to another embodiment depicted in FIG. 8, it is possible to inspect the supporting force F for each of a plurality of anti-vibration members 69 that are in contact with the U bend portion 68 merely by letting the sensor holding part 110E pass through the U bend portion 68 once.

As described above, in the supporting force inspection device 100E of another embodiment depicted in FIG. 8, the acceleration sensor 118 is configured to detect the vibration state of the U bend portion 68 while the sensor holding part 110E is moving inside the heat transfer tube 66. In the supporting force inspection device 100E according to another embodiment depicted in FIG. 8, the vibration force generation part 120E is configured to emit the sensor holding part 110E through the heat transfer tube 66 in the tube axial direction. Furthermore, in the supporting force inspection device 100E according to another embodiment depicted in FIG. 8, the sensor holding part 110E is configured to vibrate the heat transfer tube 66 in the in-plane direction by moving through the heat transfer tube 66 while sliding on the U bend portion 68. That is, the vibration force generation part 120E and the sensor holding part 110E are configured to cooperate and vibrate the heat transfer tube in the in-plane direction.

Accordingly, it is possible to detect the vibration state of the U bend portion 68 with the acceleration sensor 118 while the sensor holding part 110E is moving through the heat transfer tube 66, and thus it is possible to inspect the supporting force F of the anti-vibration member 69 in the in-plane direction quickly. Furthermore, it is possible to inspect the supporting force F of each of the anti-vibration members 69 disposed at different positions of the U bend portion 68 with a single emission of the sensor holding part 110E, and thus it is efficient.

Further, since the sensor holding part 110E is configured to move through the heat transfer tube 66 while sliding on the U bend portion 68, it is possible to generate a vibration force in the in-plane direction with a simple configuration.

In the supporting force inspection device 100E of another embodiment depicted in FIG. 8, the sensor holding part 110E is configured so as to vibrate the heat transfer tube in the in-plane direction by moving inside the heat transfer tube 66 while sliding on the U bend portion 68. Thus, the sensor holding part 110E also functions as a member to transmit vibration to the heat transfer tube 66, and it is possible to simplify the configuration of the supporting force inspection device 100E.

While the supporting force inspection devices 100A to 100E according to embodiments depicted in FIGS. 4 to 8 described above are configured such that a vibration force that vibrates the heat transfer tube 66 in the in-plane direction is applied from the inner surface side of the heat transfer tube 66, the vibration force may be applied from the outer surface side of the heat transfer tube 66.

Hereinafter, a supporting force inspection device according to yet another embodiment will be described, which can apply a vibration force for vibrating the heat transfer tube 66 in the in-plane direction from the outer surface side of the heat transfer tube 66.

Figure 14:
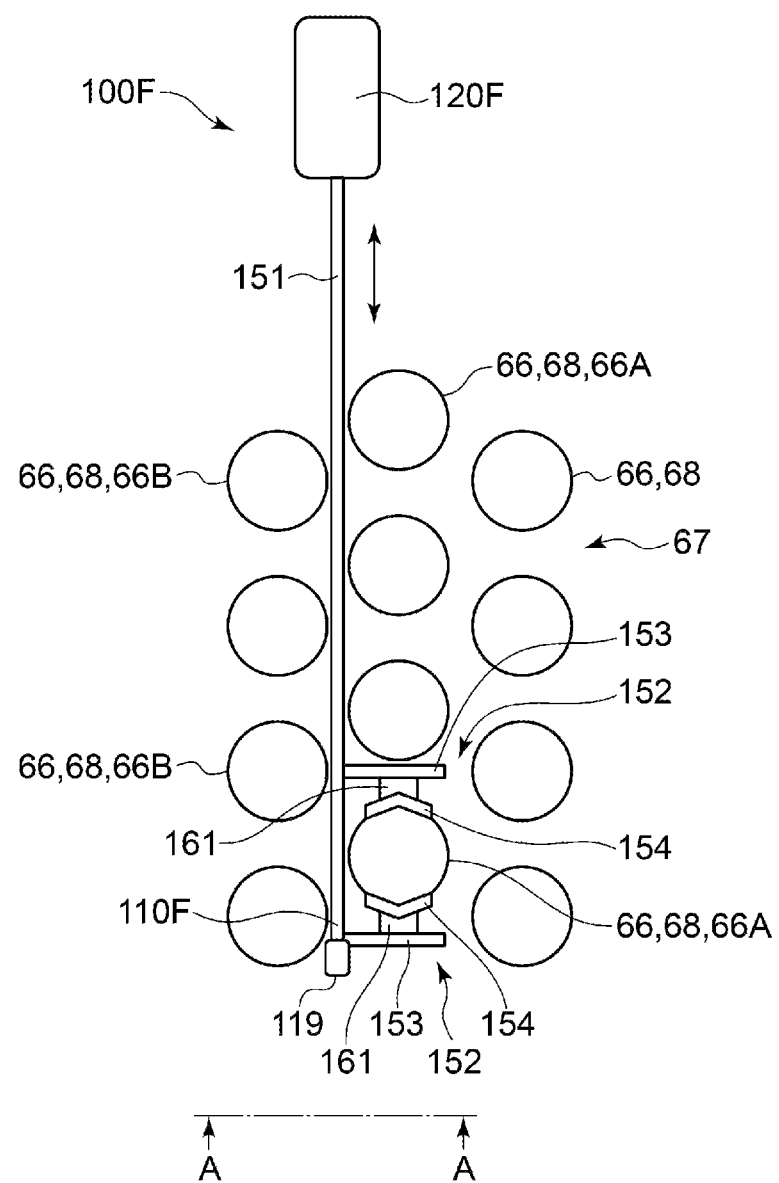
FIG. 14 is a configuration diagram schematically showing the configuration of a supporting force inspection device according to yet another embodiment.
Figure 15:
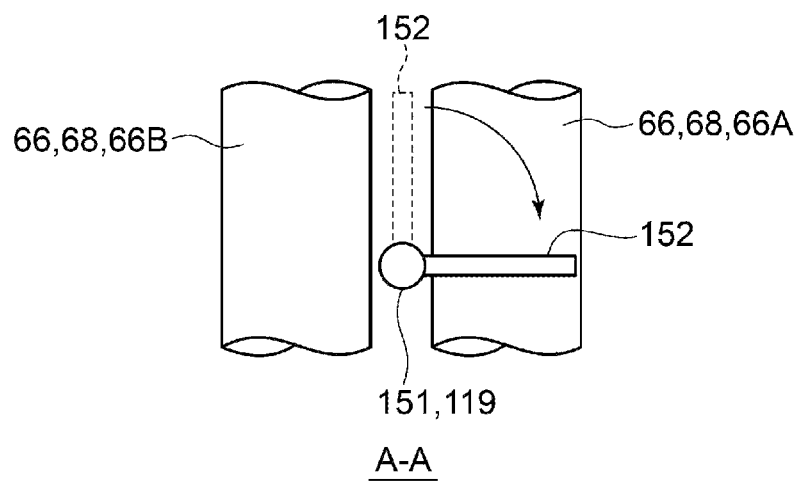
FIG. 15 is a view in a direction of arrow A from FIG. 14.

FIG. 14 is a configuration diagram schematically showing the configuration of a supporting force inspection device 100F according to yet another embodiment, as seen in the tube axial direction of the heat transfer tube 66 at the U bend portion 68. FIG. 15 is a view in a direction of arrow A from FIG. 14.

The supporting force inspection device 100F according to another embodiment depicted in FIG. 14 includes an acceleration sensor 119 for detecting the vibration state of the U bend portion 68, a sensor holding part 110F disposed outside the heat transfer tube 66 for holding the acceleration sensor 119, a vibration force generation part 120F that generates a vibration force for vibrating the heat transfer tube 66 in the in-plane direction, and a vibration rod 151 that connects the sensor holding part 110F and the vibration force generation part 120F.

The vibration force generation part 120F according to another embodiment is configured to vibrate the heat transfer tube 66 in the in-plane direction via the vibration rod 151.

Further, in FIG. 14, the in-plane direction is a direction along a plane that includes the front-back direction of the drawing of FIG. 14 and the top-bottom direction of the drawing of FIG. 14. Further, in FIG. 15, the in-plane direction is a direction along a plane that includes the top-bottom direction of the drawing of FIG. 15 and the front-back direction of the drawing of FIG. 15.

The supporting force inspection device 100F according to another embodiment depicted in FIG. 14 is configured such that the vibration rod 151 is insertable between the first heat transfer tube 66A and the second heat transfer tube 66B disposed at a distance from one another in a direction that intersects with the in-plane direction, that is, in the right-left direction of the drawing of FIG. 14.

On the first end side of the vibration rod 151, a pair of gripping portions 152 and a sensor holding part 110F are disposed. The pair of gripping portions 152 are protruding in a direction that intersects with the extension direction of the vibration rod 151, and capable of gripping the outer peripheral surface of the heat transfer tube 66. To the second end side of the vibration rod 151, the vibration force generation part 120F is connected.

As indicated by the dotted line in FIG. 15, the vibration rod 151 is configured such that the pair of gripping portions 152 are insertable between the first heat transfer tube 66A and the second heat transfer tube 66B when the protruding direction of the pair of gripping portions 152 is aligned with at least the in-plane direction. Furthermore, the vibration rod 151 is configured such that the pair of gripping portions 152 are capable of gripping the outer peripheral surface of the first heat transfer tube 66A or the second heat transfer tube 66B when the protruding direction of the pair of gripping portions 152 inserted between the first heat transfer tube 66A and the second heat transfer tube 66B is aligned with a direction that intersects with the in-plane direction as indicated by the solid line in FIG. 15 by rotating the vibration rod 151 about the axis. Further, in FIGS. 14 and 15, the pair of gripping portions 152 are gripping the outer peripheral surface of the first heat transfer tube 66A.

When the vibration force generation part 120F applies a vibration force along the extension direction of the vibration rod 151 to the vibration rod 151 while the pair of gripping portions 152 are gripping the outer peripheral surface of the heat transfer tube 66 as depicted in FIGS. 14 and 15, it is possible to apply a vibration force in the in-plane direction to the heat transfer tube 66 that is gripped by the pair of gripping portions 152 via the vibration rod 151 and the pair of gripping portions 152.

The vibration force generation part 120F according to another embodiment is configured to be capable of suitably sweeping the frequency of the vibration force.

Furthermore, each of the pair of gripping portions 152 includes an arm portion 153 that protrudes from the vibration rod 151, and a gripping hook 154 attached to the arm portion 153. The gripping hook 154 is configured to make contact with the outer peripheral surface of the heat transfer tube 66 and grip a predetermined range in the circumferential direction of the outer peripheral surface.

A vibration force detection sensor 161 for detecting a vibration force is disposed between the arm portion 153 and the gripping hook 154. The vibration force detection sensor 161 is a load cell, for instance.

By using the supporting force inspection device 100F according to another embodiment having the above configuration, it is possible to measure the supporting force F of the anti-vibration member 69 to support the heat transfer tube 66 in the in-plane direction, under a situation where the U bend portion 68 is accessible, such as the production stage of the steam generator 13, for instance. Further, also during regular maintenance or the like after starting use of the steam generator 13, if the U bend portion 68 is accessible, it is possible to measure the supporting force F of the anti-vibration member 69 to support the heat transfer tube 66 in the in-plane direction by using the supporting force inspection device 100F according to another embodiment.

Hereinafter, the procedure to inspect the supporting force using the supporting force inspection device 100E according to another embodiment depicted in FIG. 14 will be described.

In a case where the supporting force inspection device 100E according to another embodiment depicted in FIG. 14 is used to inspect the supporting force of the anti-vibration member 69, firstly, as a placement step, the tip end of the vibration rod 151 is inserted to the vicinity of the heat transfer tube 66 to be inspected from outside the heat transfer tube bundle 67, and then the outer peripheral surface of the heat transfer tube is gripped with the pair of gripping portions 152. Furthermore, the position at which the pair of gripping portions 152 grip the heat transfer tube 66 is the vicinity of the support position of one of the anti-vibration members 69, which is not depicted in FIGS. 14 and 15.

Next, as a vibration step, the heat transfer tube 66 is vibrated in the in-plane direction. Specifically, the heat transfer tube 66 is vibrated in the in-plane direction by transmitting a vibration force from the vibration force generation part 120F to the heat transfer tube 66 gripped by the pair of gripping portions 152. In the vibration step, the vibration force generation part 120F suitably sweeps the frequency of the vibration force.

In the acceleration detection step, the vibration state of the U bend portion 68 vibrated in the vibration step is detected by the acceleration sensor 119 held by the sensor holding part 110F. In the supporting force inspection device 100F according to another embodiment depicted in FIG. 14, similarly to the supporting force inspection device 100A according to an embodiment depicted in FIG. 4, on the basis of the detection result of the acceleration sensor 119 in the acceleration detection step, as depicted in FIG. 11 for instance, obtained is a graph 81 having a local maximum value (peak 82) of acceleration at a frequency f1.

Thus, in another embodiment depicted in FIG. 14, similarly to the embodiment depicted in FIG. 4, the supporting force F can be estimated from the value of the frequency f1.

Further, instead of, or in addition to the above described estimation of the supporting force F on the basis of the detection result of the acceleration sensor 119, the supporting force F may be estimated on the basis of the detection result of the vibration force detection sensor 161. That is, by using the vibration force detection sensor 161, it is possible to detect a force with which the vibration rod 151 presses the heat transfer tube 66 in the in-plane direction (pressing force). The pressing force decreases when the heat transfer tube 66 is vibrated at a vibration frequency that is substantially the same as the resonance frequency of the heat transfer tube 66. Thus, it is possible to determine the resonance frequency of the heat transfer tube 66 from the change in the pressing force with respect to the vibration frequency. Furthermore, it is possible to estimate the supporting force F in the in-plane direction from the pressing force at the time when the heat transfer tube 66 is vibrated at a vibration frequency that is substantially the same as the resonance frequency of the heat transfer tube 66.

Furthermore, the resonance frequency of the heat transfer tube 66 to be inspected may be determined on the basis of the detection result of the above described acceleration sensor 119, and the supporting force F in the in-plane direction may be estimated from the pressing force at the time when the heat transfer tube 66 is vibrated at a vibration frequency corresponding to the accordingly determined resonance frequency.

In the inspection of the supporting force using the supporting force inspection device 100F according to another embodiment depicted in FIG. 14, the gripping position at which the pair of gripping portions 152 grip the heat transfer tube 66 in the tube axial direction is suitably changed, and the supporting force F is inspected for each of the plurality of anti-vibration members 69.

As described above, the supporting force inspection device 100F according to another embodiment depicted in FIG. 14 includes the vibration rod 151 that connects the sensor holding part 110F disposed outside the heat transfer tube 66 and the vibration force generation part 120F, and the vibration force generation part 120F is configured to vibrate the heat transfer tube 66 in the in-plane direction via the vibration rod 151.

Accordingly, when the U bend portion 68 is accessible from the outer peripheral surface side of the heat transfer tube 66, it is possible to vibrate the heat transfer tube in the in-plane direction easily, and thus it is possible to accurately inspect the supporting force F of the anti-vibration member 69 in the in-plane direction accurately.

The supporting force inspection device 100F according to another embodiment depicted in FIG. 14 is configured such that the vibration rod 151 is insertable between the first heat transfer tube 66A and the second heat transfer tube 66B disposed at a distance from one another in a direction that intersects with the in-plane direction. The pair of gripping portions 152 and the sensor holding part 110F are disposed at the first end side of the vibration rod 151, and the vibration force generation part 120F is connected to the second end side of the vibration rod 151. Accordingly, it is possible to simplify the configuration of the supporting force inspection device 100F.

Furthermore, for instance, even for the heat transfer tube bundle 67 in which a plurality of heat transfer tubes 66 are disposed adjacently at small intervals like that of the steam generator 13, it is possible to insert the pair of gripping portions 152 to the vicinity of a heat transfer tube 66 from outside the heat transfer tube bundle 67, and grip the outer peripheral surface of the heat transfer tube 66 with the pair of gripping portions 152. Thus, even for the heat transfer tube bundle 67 in which a plurality of heat transfer tubes 66 are disposed adjacently at small intervals like that of the steam generator 13, it is possible to inspect the supporting force F of the anti-vibration member 69 in the in-plane direction for a desired heat transfer tube 66. Thus, it is possible to provide the supporting force inspection device 100F suitable to inspect the supporting force F of the anti-vibration member 69 to support the heat transfer tube 66 in a device including a plurality of heat transfer tubes 66 disposed adjacently at small intervals.

Embodiments of the present invention were described in detail above, but the present invention is not limited thereto, and various amendments and modifications may be implemented.

For instance, while the sensor holding part 110A in FIG. 4 is engaged with inner surface of the heat transfer tube 66 to close the inside of the heat transfer tube 66, the sensor holding part 110A may not completely close the inside of the heat transfer tube 66. As long as the inspection of the supporting force F is not impaired, clearance may exist between the sensor holding part 110A and the inner surface of the heat transfer tube 66.

Furthermore, even in a situation where the liquid 191 of some volume leaks from the clearance between the sensor holding part 110A and the inner surface of the heat transfer tube 66, pressure loss occurs when the liquid 191 flows through the clearance between the sensor holding part 110A and the inner surface of the heat transfer tube 66.

Thus, even in a situation where the liquid 191 of some volume leaks from the clearance between the sensor holding part 110A and the inner surface of the heat transfer tube 66, it is possible to vibrate the U bend portion 68 to bend and stretch in the in-plane direction by applying pressure to the liquid 191 filling the inside of the heat transfer tube 66 with the vibration force generation part 120A.

Furthermore, for instance, the supporting force inspection devices 100A to 100D according to the above described embodiments are configured such that, the sensor holding parts 110A to 110D are each engageable with the inner surface of the heat transfer tube 66 as the motor holding body 111 and the eccentric cam 112 press the inner surface of the heat transfer tube 66. However, the structure for causing the sensor holding parts 110A to 110D to be engaged with the inner surface of the heat transfer tube 66 is not limited to the above described structure.

Further, for instance, while the supporting force inspection devices 100A to 100F of the above embodiments are used to inspect the supporting force for the heat transfer tube 66 of the steam generator 13 of a nuclear power plant in the above description, the inspection target of the supporting force inspection devices 100A to 100F of the above described embodiments is not limited to the heat transfer tube 66 of the steam generator 13 of a nuclear power plant. For instance, the supporting force inspection devices 100A to 100F of the above described embodiments may be used to inspect a supporting force for a heat transfer tube of a tube-type heat exchanger of a chemical plant, or various pipes in various plants or pipelines.

REFERENCE SIGNS LIST

12 Pressurized water reactor
13 Steam generator

66 Heat transfer tube
68 U bend portion
69 Anti-vibration member (vibration suppression member)
100A to 100F Supporting force inspection device
102B, 102C Projectile
103D Fluid
110A to 110F Sensor holding part
111 Motor holding body
112 Eccentric cam
113 Sensor holding body
115 Motor
116, 118, 119 Acceleration sensor
120A to 120F Vibration force generation part
151 Vibration rod
152 Gripping portion

The invention claimed is:

1. A supporting force inspection device for inspecting a supporting force of a vibration suppression member interposed between bend portions of a plurality of heat transfer tubes of a steam generator, the supporting force inspection device comprising:
an acceleration sensor for detecting a vibration state of the bend portion;
a sensor holding part disposed inside the heat transfer tube and configured to hold the acceleration sensor; and
a vibration force generation part configured to generate a vibration force for vibrating the heat transfer tube along a plane in which a curvature circle of the bend portion exists,
wherein the vibration force generation part is configured to cooperate with the sensor holding part and vibrate the heat transfer tube along the plane in which the curvature circle exists.

2. The supporting force inspection device according to claim 1,
wherein the acceleration sensor is configured to detect the vibration state of the bend portion in a state where the sensor holding part is engaged with an inner surface of the heat transfer tube.

3. The supporting force inspection device according to claim 2,
wherein the sensor holding part includes a motor holding body holding a motor, an eccentric cam configured to be rotated relative to the motor holding body by the motor, and a sensor holding body holding the acceleration sensor and fixed to the motor holding body, the sensor holding part being configured to be engaged with the inner surface of the heat transfer tube as the motor rotates the eccentric cam relative to the motor holding body and the motor holding body and the eccentric cam press the inner surface of the heat transfer tube.

4. The supporting force inspection device according to claim 2,
wherein the vibration force generation part is configured to generate the vibration force so that the vibration force changes with time.

5. The supporting force inspection device according to claim 4,
wherein the sensor holding part is configured to close an inside of the heat transfer tube in a state of being engaged with the inner surface of the heat transfer tube, and
wherein the vibration force generation part is configured to apply a pressure to a liquid filling the inside of the heat transfer tube closed by the sensor holding part so that the pressure changes with time.

6. The supporting force inspection device according to claim 2,
wherein the vibration force generation part is configured to emit a projectile into the heat transfer tube in a tube axial direction toward the sensor holding part engaged with the inner surface of the heat transfer tube, and
wherein the sensor holding part is configured to vibrate the heat transfer tube along the plane in which the curvature circle exists by transmitting, to the heat transfer tube, an impulse force generated from collision with the projectile.

7. The supporting force inspection device according to claim 2,
wherein the vibration force generation part is held by the sensor holding part and is configured to apply the vibration force to the sensor holding part, and
wherein the sensor holding part is configured to vibrate the heat transfer tube along the plane in which the curvature circle exists by transmitting, to the heat transfer tube, the vibration force applied by the vibration force generation part held by the sensor holding part.

8. The inspection force detection device according to claim 7,
wherein the vibration force generation part is configured to apply the vibration force to the sensor holding part by emitting a projectile.

9. The inspection force detection device according to claim 7,
wherein the vibration force generation part is configured to apply the vibration force to the sensor holding part so that a magnitude of the vibration force changes with time by injecting a fluid intermittently.

10. The inspection force detection device according to claim 1,
wherein the acceleration sensor is configured to detect the vibration state of the bend portion in a state where the sensor holding part is moving inside the heat transfer tube,
wherein the vibration force generation part is configured to emit the sensor holding part into the heat transfer tube in a tube axial direction, and
wherein the sensor holding part is configured to vibrate the heat transfer tube along the plane in which the curvature circle exists by moving inside the heat transfer tube while sliding on the bend portion.

11. A supporting force inspection device for inspecting a supporting force of a vibration suppression member interposed between bend portions of a plurality of heat transfer tubes of a steam generator, the supporting force inspection device comprising:
an acceleration sensor for detecting a vibration state of the bend portion;
a sensor holding part disposed outside the heat transfer tube and configured to hold the acceleration sensor;
a vibration force generation part configured to generate a vibration force for vibrating the heat transfer tube along a plane in which a curvature circle of the bend portion exists; and
a vibration rod connecting the sensor holding part and the vibration force generation part,
wherein the vibration force generation part is configured to apply the vibration force along an extension direction of the vibration rod to the vibration rod and vibrate the heat transfer tube along the plane in which the curvature circle exists via the vibration rod.

12. The supporting force inspection device according to claim 11,
wherein the vibration rod is configured to be insertable between a first heat transfer tube and a second heat transfer tube disposed at a distance from one another in a direction which intersects with the plane in which the curvature circle exists,
wherein the sensor holding part and a pair of gripping portions are disposed on a first end side of the vibration rod, the pair of gripping portions protruding in a direction which intersects with an extension direction of the vibration rod and being capable of gripping an outer peripheral surface of the heat transfer tube,
wherein the vibration force generation part is connected to a second end side of the vibration rod, and
wherein the vibration rod is configured such that the pair of gripping portions are insertable between the first heat transfer tube and the second heat transfer tube when a protruding direction of the pair of gripping portions is aligned with at least a direction along the plane in which the curvature circle exists, and that the pair of gripping portions are capable of gripping the outer peripheral surface of the first or second heat transfer tube when the protruding direction of the pair of gripping portions inserted between the first heat transfer tube and the second heat transfer tube is aligned with the direction which intersects with the plane in which the curvature circle exists.

13. A method of inspecting a supporting force of a vibration suppression member interposed between bend portions of a plurality of heat transfer tubes of a steam generator, the method comprising:
a placement step of placing, inside the heat transfer tube, a sensor holding part to hold an acceleration sensor for detecting a vibration state of the bend portion;
a vibration step of vibrating the heat transfer tube along a plane in which a curvature circle of the bend portion exists, through cooperation of the sensor holding part and a vibration force generation part configured to generate a vibration force for vibrating the heat transfer tube along the plane in which the curvature circle exists; and
an acceleration detection step of detecting the vibration state of the bend portion vibrated in the vibration step by using the acceleration sensor held by the sensor holding part.

14. The method of inspecting a supporting force according to claim 13,
wherein the placement step includes closing an inside of the heat transfer tube with the sensor holding part being engaged with an inner surface of the heat transfer tube, and
wherein the vibration step includes vibrating the heat transfer tube along the plane in which the curvature circle exists by filling the inside of the heat transfer tube closed by the sensor holding part with a liquid and applying a pressure to the liquid filling the inside of the heat transfer tube so that the pressure changes with time.

* * * * *